(12) United States Patent
Christensen

(10) Patent No.: US 10,621,672 B1
(45) Date of Patent: Apr. 14, 2020

(54) BROADCASTING VEHICLE AND INSURANCE INFORMATION TO MOBILE DEVICES IN THE VICINITY OF A VEHICLE

(71) Applicant: STATE FARM MUTAL AUTOMOBILE INSURANCE COMPANY, Bloomington, IL (US)

(72) Inventor: Scott T. Christensen, Salem, OR (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 237 days.

(21) Appl. No.: 15/059,544

(22) Filed: Mar. 3, 2016

Related U.S. Application Data

(60) Provisional application No. 62/134,930, filed on Mar. 18, 2015, provisional application No. 62/155,858, filed on May 1, 2015, provisional application No. 62/169,607, filed on Jun. 2, 2015, provisional application No. 62/192,411, filed on Jul. 14, 2015,
(Continued)

(51) Int. Cl.
| | |
|---|---|
| *G06Q 40/08* | (2012.01) |
| *G06Q 40/02* | (2012.01) |
| *G07C 5/00* | (2006.01) |
| *H04L 29/08* | (2006.01) |
| *H04W 4/80* | (2018.01) |

(52) U.S. Cl.
CPC .......... *G06Q 40/08* (2013.01); *G06Q 40/025* (2013.01); *G07C 5/008* (2013.01); *H04L 67/12* (2013.01); *H04W 4/80* (2018.02)

(58) Field of Classification Search
CPC ...................................... G06Q 40/08

USPC ............................................. 705/4
See application file for complete search history.

(56) References Cited

U.S. PATENT DOCUMENTS

| | | | | |
|---|---|---|---|---|
| 2006/0229981 | A1* | 10/2006 | Crites ................... | G06Q 10/00 705/40 |
| 2010/0131304 | A1* | 5/2010 | Collopy ............ | G06Q 30/0224 705/4 |
| 2014/0257873 | A1* | 9/2014 | Hayward .............. | G07C 5/008 705/4 |

OTHER PUBLICATIONS

Politics & Government Week; "Patents; Researchers submit patent application, electronic system installed in a motor vehicle and method of processing data for a motor vehicle, for approval"; Atlanta, Jun. 25, 2015 (Year: 2015).*

(Continued)

*Primary Examiner* — Edward Chang

(57) ABSTRACT

A system for transmitting and receiving vehicle, insurance, and financial information comprises a communication beacon, a vehicle control system, and a mobile electronic device. The communication beacon is associated with one of a plurality of vehicles and transmits information about the associated vehicle. The vehicle control system is associated with one of the vehicles, and configured to transmit information about the associated vehicle after a trigger event occurs. The mobile electronic device includes a communication element and a processing element that executes a software application configured to receive vehicle information from the communication beacon or the vehicle control system (both of which may be Bluetooth® enabled and/or include an accelerometer), transmit vehicle information to a computer server, receive term information regarding an insurance quote or auto loan, the term information determined by the server based upon the vehicle information, and display the term information on a screen to a customer.

28 Claims, 10 Drawing Sheets

Related U.S. Application Data provisional application No. 62/253,784, filed on Nov. 11, 2015.

(56) References Cited

OTHER PUBLICATIONS

Brielle Jaekel (AutoTrader.com developing beacons to engage car buyers) Mar. 13, 2015 http://www.mobilecommercedaily.com/autotraders-mobile-future-lies-in-beacon-technology.

* cited by examiner

BROADCASTING VEHICLE AND INSURANCE INFORMATION TO MOBILE DEVICES IN THE VICINITY OF A VEHICLE

RELATED APPLICATIONS

The current patent application is a non-provisional patent application which claims priority benefit with regard to all common subject matter to U.S. Provisional Application Ser. No. 62/134,930, titled "BROADCASTING VEHICLE & INSURANCE INFORMATION TO MOBILE DEVICES IN THE VICINITY OF A VEHICLE", filed Mar. 18, 2015; U.S. Provisional Application Ser. No. 62/155,858, titled "BROADCASTING VEHICLE AND INSURANCE INFORMATION TO MOBILE DEVICES IN THE VICINITY OF A VEHICLE", filed May 1, 2015; U.S. Provisional Application Ser. No. 62/169,607, titled "BROADCASTING VEHICLE AND INSURANCE INFORMATION TO MOBILE DEVICES IN THE VICINITY OF A VEHICLE", filed Jun. 2, 2015; U.S. Provisional Application Ser. No. 62/192,411, titled "BROADCASTING VEHICLE AND INSURANCE INFORMATION TO MOBILE DEVICES IN THE VICINITY OF A VEHICLE", filed Jul. 14, 2015; and U.S. Provisional Application Ser. No. 62/253,784, titled "BROADCASTING VEHICLE AND INSURANCE INFORMATION TO MOBILE DEVICES IN THE VICINITY OF A VEHICLE", filed Nov. 11, 2015. The listed earlier-filed provisionals applications are hereby incorporated by reference in their entireties into the current patent application.

FIELD OF THE INVENTION

The present disclosure generally relates to systems and methods for broadcasting and receiving vehicle, insurance, and financial information.

BACKGROUND

A customer considering buying a new or used vehicle typically visits one or more dealerships or showrooms and browses the vehicles in stock. Afterward, the customer may contact multiple insurance carriers to request a quote for automobile insurance. Or, the customer may browse the web sites of the insurance carriers to request an automobile insurance quote. Often, the customer has to type in the information, such as year, make, and model, for the vehicle of interest. This process can be time-consuming, particularly if the customer is interested in more than one vehicle. Alternatively, if the customer already holds a policy with an insurance carrier, he may contact his agent to request a quote for a new policy or an estimate of the new premium payment. This process is still time-consuming and may require the agent or policyholder to calculate premium differentials.

The customer may also wish to finance the vehicle. The customer may go through a similar process as above—contacting banks and lending institutions, each time supplying information about the vehicle. The lack of immediate insurance or financing information forces the customer to potentially delay purchasing decisions that could be made at the dealership while looking at the vehicle.

BRIEF SUMMARY

Embodiments of the present technology relate to systems and computer-implemented methods for transmitting and receiving vehicle, insurance, and financial information. The embodiments provide for transmitting vehicle information from a communication beacon or a vehicle control system. The vehicle information is received by a mobile electronic device which may transmit the vehicle information to a computer server. The computer server may determine an auto insurance rate, terms of a vehicle loan, or both. The term information may be transmitted back to the mobile device which displays the information on a screen to a customer. The customer may input either approval or modification of the terms and the mobile electronic device transmits the input to the computer server.

In a first aspect, a system for transmitting and receiving vehicle, insurance, and financial information may be provided. The system may comprise at least one communication beacon, at least one vehicle control system, and a mobile electronic device. The communication beacon may be associated with one of a plurality of vehicles and transmits information about the associated vehicle. The vehicle control system may be associated with one of a plurality of vehicles. The communication beacon and/or vehicle control system may be Bluetooth® enabled, may include various sensors to detect trigger events, and/or may be configured to transmit vehicle information about the associated vehicle after a trigger event occurs. The mobile electronic device may also be Bluetooth® enabled, and include one or more sensors configured to detect trigger events. Exemplary trigger events may be generated from and/or based upon (1) the vehicle's built in features (e.g., seat sensors, door sensors, accelerometers, GPS data, speed sensors, or motion sensors); (2) an external communication beacon placed or positioned within the vehicle (e.g., an iBeacon® with an accelerometer or other sensor(s)); (3) a mobile device, such as a smart phone (i.e., GPS data that includes speed information and/or using the GPS data to determine that the vehicle is moving or traveling above a minimum speed, such as 5 miles per hour); and/or other triggers, including those discussed elsewhere herein. The mobile electronic device may include a communication element, a memory element, and/or a processing element which executes a software application. The software application may be configured to receive vehicle information from the communication beacon and/or the vehicle control system, transmit the vehicle information to a computer server, receive term information regarding an insurance quote or auto loan, the term information determined by the computer server based upon the vehicle information, and/or display the term information on a screen (such as on a mobile device or a smart vehicle/vehicle control system display screen) to a customer to facilitate providing auto insurance or a vehicle loan to the customer and/or enhancing the online customer experience. The system may include additional, less, or alternate functionality, including that discussed elsewhere herein.

In another aspect, a computer-implemented method for transmitting and receiving vehicle, insurance, and financial information may be provided. The method may include: (1) transmitting information about a vehicle on a regular basis from a communication beacon and/or vehicle control system; (2) detecting a trigger event occurring in a vehicle with the communication beacon and/or the vehicle control system (or a mobile electronic device); (3) transmitting information about the vehicle from the communication beacon and/or the vehicle control system after the trigger event occurs; (4) receiving vehicle information with the mobile electronic device; (5) transmitting vehicle information from the mobile electronic device to a computer server; (6) receiving insurance quote or auto loan information with the mobile electronic device from the computer server; and/or (7) displaying an insurance quote or auto loan information on the mobile electronic device (and/or vehicle control system display) to a customer to facilitate providing auto insurance or a vehicle loan to the customer and/or enhancing the online customer experience. The method may include additional, less, or alternate actions, including those discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

Figure 1:
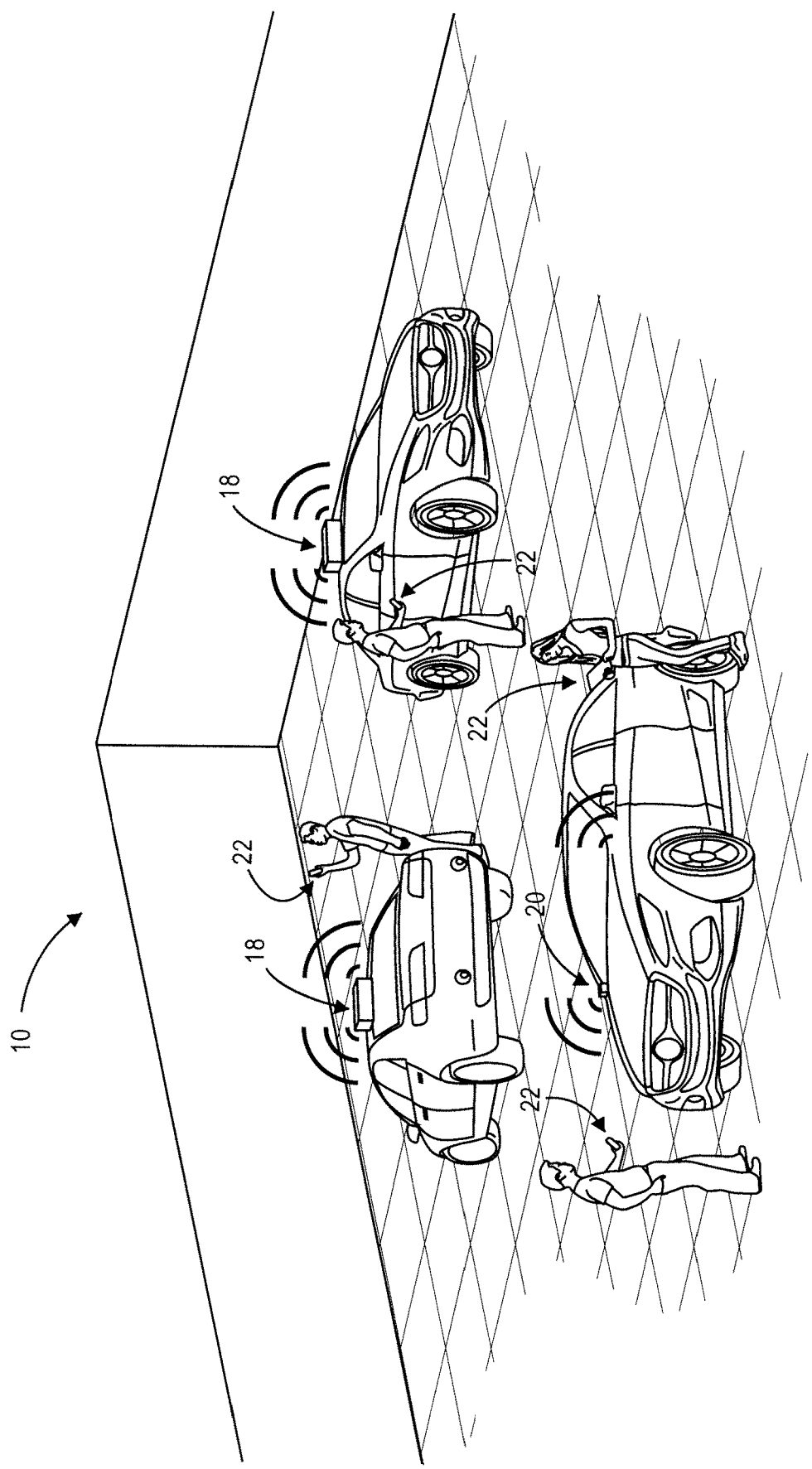
FIG. 1 illustrates an exemplary environment in which embodiments of a system may be utilized for transmitting and receiving vehicle, insurance, and/or financial information.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, enhancing customer service by providing instant insurance quotes, vehicle loan offers, and/or other services to existing policyholders while they are at vehicle dealerships. Vehicle and insurance information may be transmitted to a mobile device of an insurance customer while they are shopping for vehicles at one or more vehicle dealerships. The vehicle and insurance information may be transmitted to the customer mobile device directly from a smart vehicle controller of a vehicle or from a vehicle-mounted beacon, such as an iBeacon®. Additionally or alternatively, the vehicle and insurance information may be directly or indirectly transmitted to customer mobile device from a remote server, such as a financial services or insurance provider, or vehicle manufacturer, remote server. The vehicle controller and/or vehicle-mounted beacon may act as a relay between the remote server and customer mobile device in some embodiments.

The vehicle information may include several features of a new vehicle being offered for sale by the dealership, such as one or more autonomous or semi-autonomous technologies or functionalities, safety features, and/or vehicle make, model, mileage, year, color, etc. The vehicle information may also include several features of a trade-in vehicle that presently belongs to the insured or customer, including the trade-in price or blue book value.

The insurance information may include an insurance quote for a new insurance policy covering the new vehicle, along with limits, coverages, and deductible information. Additionally or alternatively, the insurance information may include drivers to be covered by insurance for the vehicle, and/or insurance premiums, discounts, rates, or other insurance information associated with the vehicle. The insurance information may also include updated premiums if the new vehicle is purchased, and the old vehicle is traded in, or otherwise sold.

In one embodiment, an insurance provider (or financial services provider) may create, purchase, and/or program Bluetooth® LE beacons that contain information about select vehicles. Bluetooth® LE beacons, after programming, may then be sent to select dealerships. iBeacons® may initially be sent to dealerships with high volume, for example. Beacons for new model year vehicles may have information about the vehicle (year, make, model, etc.) and be placed in, on, and/or near the vehicle. Beacons may broadcast car or other type of vehicle information to an insurance provider mobile device app, such as the State Farm Pocket Agent smart phone app, when the customer is within or near the selected vehicle, or near the beacon. The app may be a standalone app that has access to an insurance customer's existing insurance policy and/or other customer information.

When a policyholder is near the vehicle, the Pocket Agent app may use the vehicle information from the beacon to calculate and display an insurance quote for the vehicle at the dealership. The Pocket Agent app may notify the customer that an instant quote is available for the vehicle they are presently physically within or near. Upon opening the Pocket Agent app, a quote may be displayed for the vehicle that the policyholder is within or near. Policyholders may have the option to compare the quotes from multiple vehicles, including other vehicles that the policyholder has looked at while at the dealership(s). Quotes may be compared to existing policies. For instance, the policy for the new vehicle may be presented as a policy for an added or replacement vehicle, and displayed for side-by-side comparison with policies of existing vehicles owned by the policyholder.

When new model year vehicles become available, the beacons may be reprogrammed with new information and moved to, and/or mounted on or within, the new vehicles. Dealerships may provide input on which of their vehicles they would like the beacons to be assigned to. A separate app may be provided to dealerships allowing them to reassign the beacon to a new vehicle.

Exemplary Dealership Benefits

A dealership may benefit from having these beacons in popular vehicles. Exemplary benefits to dealerships may include those mentioned below. For instance, one benefit may relate to additional vehicle information. The mobile device app may provide links to vehicle safety information to showcase the features of the vehicle. As new vehicles (e.g., automobiles, boats, planes, mobile homes, etc.) are produced with newer technology and better features, the app may be able to provide additional information about the vehicle's technology that may not be intuitive without driving the vehicle. The app may provide interactive screens to explore the type of engine and "what's under the hood," and/or tutorials on how to use new technology in the vehicle.

Another benefit may relate to streamlining the insurance process. The app may streamline the process of switching insurance to the new vehicle so that the dealership wouldn't need to wait for any delays caused by lack of coverage. It may also provide a unique means of allowing insurance customers certain benefits, such as adding insurance for a new vehicle and/or cancelling insurance for an old or trade-in vehicle.

Another benefit may relate to summary statistics. An insurance provider could send the dealership or manufacturer summary information about the vehicles that a majority of customers are interested in. For instance, in January, 50% of app users in the dealership approached the 2016 Honda Civic spending an average of 10 minutes near the vehicle. Of those that approached the 2016 Honda Civic, 10% viewed a comparison quote as a replacement for their current vehicle. The summary statistics may reveal to vehicle dealers which vehicles are, or are not, moving off the lot or selling in a timely manner—such as to provide for inventory management, and/or to provide vehicle sales information.

Another benefit may relate to dealership information. The app may provide links to other dealership sponsored information. For instance, the app may provide links to dealership promotions or specials.

Another benefit may relate to financing information. The app may connect the policyholder to a bank, such as State Farm Bank, to provide information about financing options and/or a pre-approved car or other vehicle loan. This may make the financing process for the dealership more efficient. If the dealership offers financing, a link to that information may be provided in the app.

Another benefit may relate to vehicle trade-in information. The app may provide the dealership information about the vehicle (e.g., automobile, boat, plane, motor cycle, etc.) that the customer plans to trade in to make it easier to provide and/or determine the trade-in value (or estimated value) of the vehicle being replaced.

Another benefit may relate to finding the right car (or other vehicle). The app may allow the customer to select the features that they are looking for in a vehicle, and/or notify the customer when the vehicle they are near matches their criteria. Or, if the vehicle is not a perfect match, which desired features are not available.

Exemplary Embodiments

Figure 4:
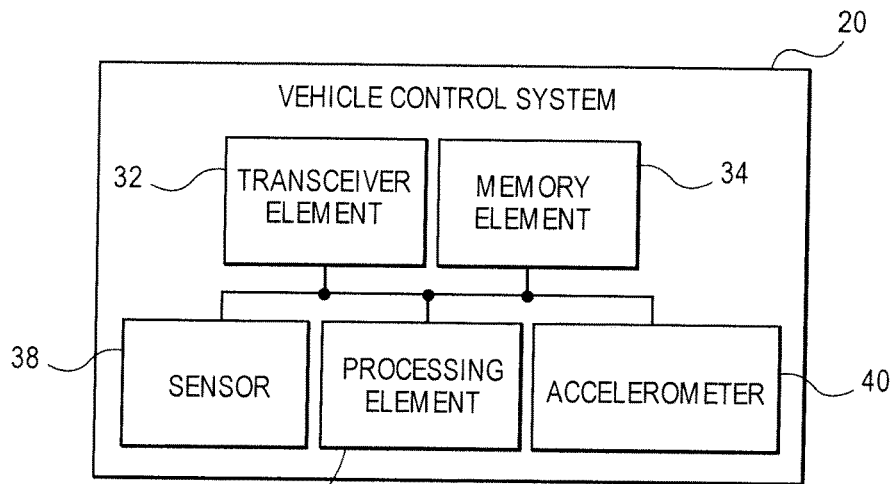
FIG. 4 illustrates various components of an exemplary vehicle control system shown in block schematic form.
Figure 5:
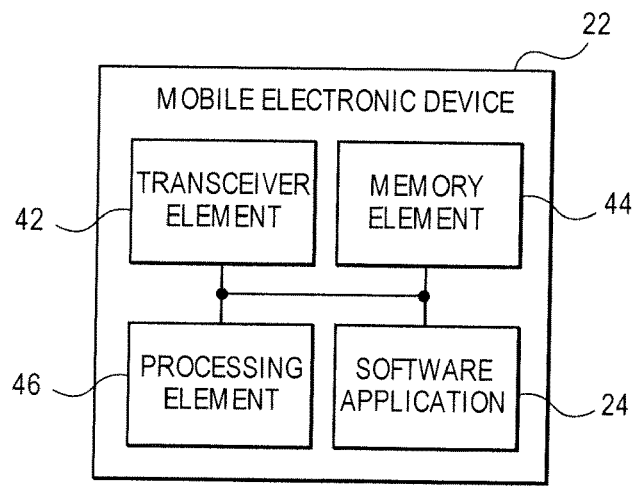
FIG. 5 illustrates various components of an exemplary mobile electronic device shown in block schematic form.

The present embodiments described in this patent application and other possible embodiments may relate to systems and methods for transmitting and receiving vehicle, insurance, and financial information. Embodiments of the present invention may be utilized to provide a customer with immediate insurance and/or financing information when he is considering buying a new or used vehicle. In some embodiments, insurance and/or financial institutions may procure a plurality of communication beacons, such as Bluetooth® beacons or iBeacons®, and program, or otherwise configure, them with data regarding the vehicle or pointers to special offers. Each communication beacon may include a wireless transmitter and receiver (transceiver), memory, and processor electronic circuits housed in a small box or package. Additionally or alternatively, each communication beacon may include an accelerometer (and/or other sensors) to detect vehicle movement (such as opening a car door or test driving the vehicle). Each communication beacon may also include additional or alternative hardware or sensors, including those discussed elsewhere herein and/or in relation to the exemplary vehicle control system and/or mobile electronic device (see, e.g., FIGS. 4 and 5 and accompanying text).

The communication beacon may transmit the information to a mobile electronic device when the beacon detects the presence of the device nearby. The insurance and/or financial institutions may provide vehicle dealerships with communication beacons associated with vehicles of interest for which the institutions want to offer information or deals. One or more communication beacons may be placed in, on, or in close proximity to each vehicle of interest.

In other embodiments, certain vehicles may be equipped with a vehicle control system that may include a wireless transceiver, antenna, memory, and/or processor electronic circuits. The vehicle control system may be programmed, or otherwise configured, with the same data as the communication beacons. The vehicle control system may transmit the information to the mobile electronic device either when the device is in the presence of the vehicle or when a trigger event, such as the customer sitting in the vehicle, or being near the vehicle for a sustained period of time, occurs.

With either embodiment, the customer may visit a vehicle dealership and browse the vehicles. If the customer is in possession of a mobile electronic device, such as a smart watch, a smart phone, a tablet, a palmtop or laptop computer, smart glasses, PDA (Personal Digital Assistant), or other mobile device configured for wireless communication and/or data transmission, the communication beacon or the vehicle control system may detect the presence of the mobile electronic device and may transmit the data thereto. The mobile electronic device may be executing a software application that receives the data. If the data includes vehicle information, such as vehicle identification number (VIN) or a make, a model, and a year of the vehicle, then the application may transmit the information to a server of one or more institutions, such as an insurance provider, financial institution, or vehicle manufacturer.

The server may return information to the mobile electronic device regarding an automobile insurance rate quote or a loan offer. The software application may display the information on a screen of the mobile electronic device and may present an option for the customer to save the information. If the data includes a pointer, then the software application may follow the pointer to a server or web site that includes information about special offers for the particular vehicle or group of vehicles. The special offers may include discounted insurance rates, special financing deals, limited time deals, and the like. The software application may display the special offers on the screen of the mobile electronic device and may present an option for the customer to save the special offers. Additionally, the software application may prompt the user to approve or modify the terms of an insurance offer, a loan offer, or both. The software application may then transmit the user's choice back to the server.

Alternatively, the software application may be an extension of, or in communication with, an existing software application, such as the Pocket Agent application from the State Farm Mutual Automobile Insurance Company of Bloomington, Ill. The software application of the present invention may receive vehicle information from the communication beacon or the vehicle control system, and may transfer the information to the existing software application, which may transmit the information to the appropriate server to request insurance or loan information.

Specific embodiments of the technology will now be described in connection with the attached drawing figures. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Exemplary System

Figure 2:
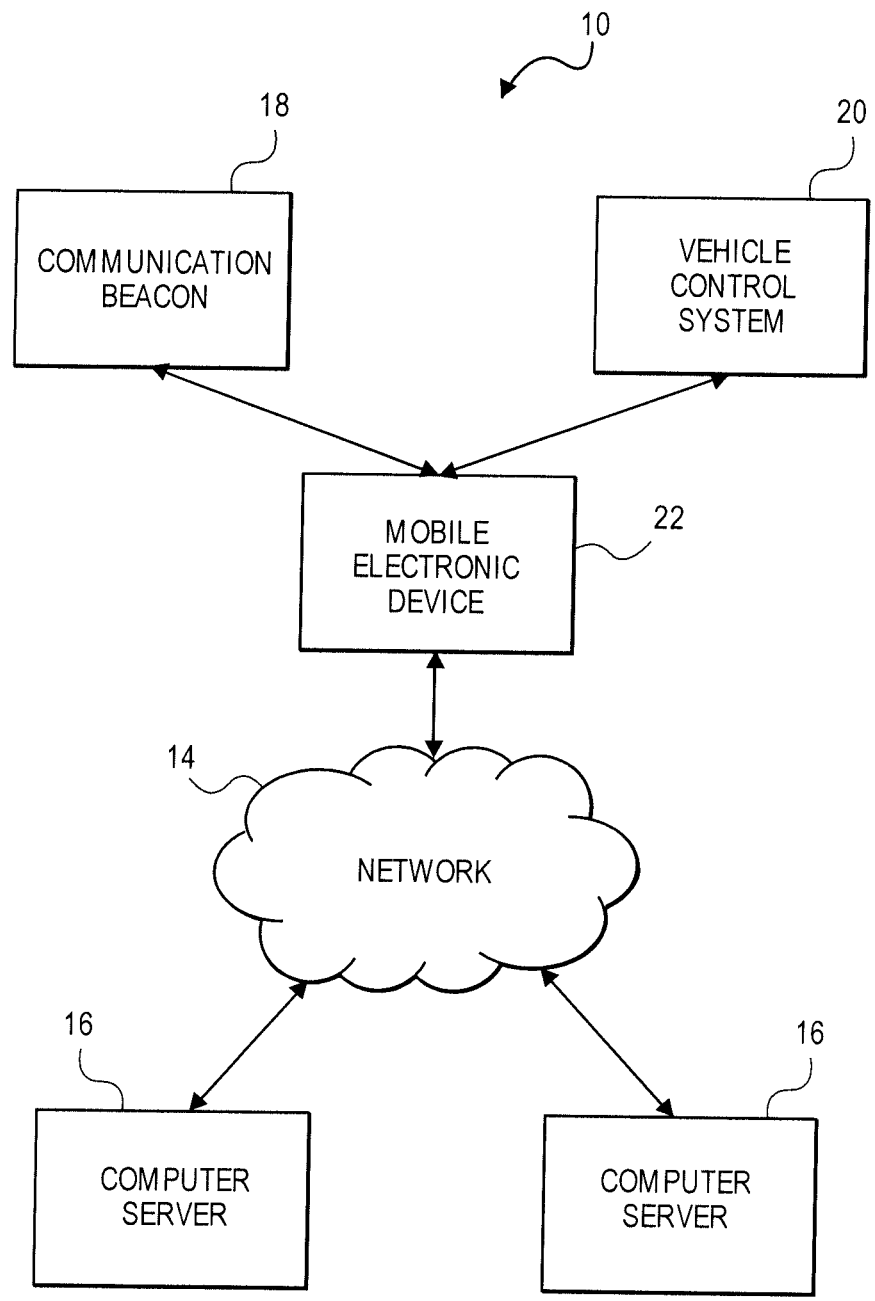
FIG. 2 illustrates various components of the exemplary system shown in block schematic form.

FIGS. 1 and 2 depict an exemplary environment in which embodiments of a system 10 may be utilized for transmitting and receiving vehicle, insurance, and/or financial data. The environment may include a vehicle dealership, as seen in FIG. 1, which includes a plurality of vehicles 12 for sale, wherein the vehicles 12 may be new or used and of any type. The environment may further include a network 14 and one or more computer servers 16, as seen in FIG. 2, with which the system 10 interfaces to send and receive vehicle, financing, and/or insurance information. The system 10 may be utilized to automatically communicate with an insurance and/or financial institution to provide a customer with insurance rate and/or auto loan information. In some cases, multiple institutions may be involved. In other cases, a single institution may provide both insurance and financing services. The system 10 may broadly comprise one or more communication beacons 18, one or more vehicle control systems 20, and one or more mobile electronic devices 22, each executing a software application 24.

The network 14 may generally allow communication between the mobile electronic devices 22 and the servers 16. The network 14 may include local area networks, metro area networks, wide area networks, cloud networks, the Internet, cellular networks, plain old telephone service (POTS) networks, and the like, or combinations thereof. The network 14 may be wired, wireless, or combinations thereof and may include components such as modems, gateways, switches, routers, hubs, access points, repeaters, towers, and the like. The mobile electronic devices 22 generally connect to the network 14 wirelessly, such as radio frequency (RF) communication using wireless standards such as cellular 2G, 3G, or 4G, Institute of Electrical and Electronics Engineers (IEEE) 802.11 standards such as WiFi, IEEE 802.16 standards such as WiMAX, Bluetooth®, or combinations thereof.

Each computer server 16 generally retains electronic data and may respond to requests to retrieve data as well as to store data. The computer server 16 may be embodied by application servers, database servers, file servers, gaming servers, mail servers, print servers, web servers, or the like, or combinations thereof. Furthermore, the computer server 16 may include a plurality of servers, virtual servers, or combinations thereof. The computer server 16 may also include processors, memory storage such as optical drives, hard disk drives, rack-mount drives, blade drives, and the like, and transceiver components that provide communication with the network 14.

The computer server 16 may be configured to include or execute software such as file storage applications, database applications, email or messaging applications, web server applications, or the like. The computer server 16 may apply business methods or algorithms, may utilize lookup tables or databases, or combinations thereof to determine insurance rates or premiums, terms of a loan, or both. Insurance providers and financial institutions may each own one or more computer servers 16 that may automatically provide information about insurance rates and premiums, as well as loan information when a request for such information is received.

Figure 3:
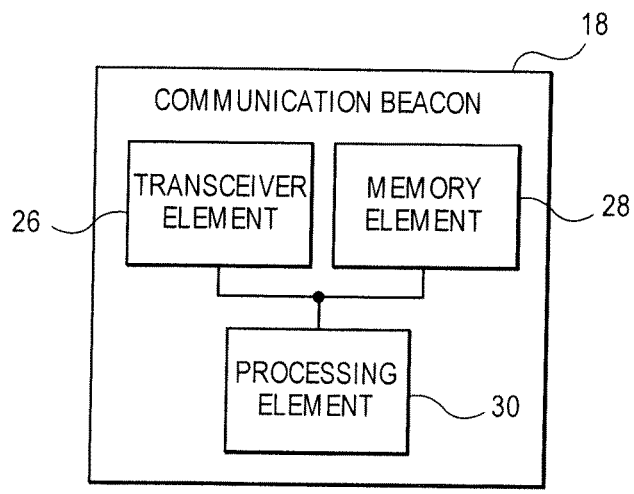
FIG. 3 illustrates various components of an exemplary communication beacon shown in block schematic form.

Each communication beacon 18 may generally provide information to a mobile electronic device 22 when the mobile electronic device 22 is in the vicinity of the communication beacon 18. The communication beacon 18 may be embodied by a Bluetooth® beacon or an iBeacon®, each of which utilize the Bluetooth® wireless communication protocol in general, or the Bluetooth® low energy (BLE) protocol. It is within the scope of the present invention that the communication beacon 18 may additionally or alternatively utilize other communication protocols, such as WiFi, WiMAX, cellular, or the like. The communication beacon 18 may include a transceiver element 26, a memory element 28, and a processing element 30, seen in FIG. 3, as well as an electrical power source housed in a small box or package. One or more communication beacons 18 may be placed on, such as on the roof, trunk, or hood, in, such as on a seat, on the center console, or on the dashboard, or within a few feet of each associated vehicle 12.

The transceiver element 26 may generally allow communication with systems or devices external to the communication beacon 18. The transceiver element 26 may include signal or data transmitting and receiving circuits, such as antennas, amplifiers, filters, mixers, oscillators, digital signal processors (DSPs), and the like. The transceiver element 26 may establish communication wirelessly by utilizing RF signals and/or data that comply with communication standards such as cellular 2G, 3G, or 4G, WiFi, WiMAX, Bluetooth®, BLE, or combinations thereof. The transceiver element 26 may be in communication with the processing element 30 and the memory element 28.

The memory element 28 may include data storage components, such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 28 may be embedded in, or packaged in the same package as, the processing element 30. The memory element 28 may include, or may constitute, a "computer-readable medium". The memory element 28 may store the instructions, code, code segments, software, firmware, programs, applications, apps, services, daemons, or the like that are executed by the processing element 30. In particular, the memory element 28 may store information about a particular vehicle 12.

The processing element 30 may include processors, microprocessors (single-core and multi-core), microcontrollers, DSPs, field-programmable gate arrays (FPGAs), analog and/or digital application-specific integrated circuits (ASICs), or the like, or combinations thereof. The processing element 30 may generally execute, process, or run instructions, code, code segments, software, firmware, programs, applications, apps, processes, services, daemons, or the like. The processing element 30 may also include hardware components such as finite-state machines, sequential and combinational logic, and other electronic circuits that can perform the functions necessary for the operation of the current invention. The processing element 30 may be in communication with the other electronic components through serial or parallel links that include address busses, data busses, control lines, and the like.

Each communication beacon 18 may be assigned or configured, typically by its manufacturer, with a universally unique identifier (UUID), a 128-bit value. In addition, each communication beacon 18 may be programmed or configured by insurance carriers, financial institutions, or vehicle dealers to include information about an associated vehicle 12, such as the vehicle identification number (VIN), the make, the model, the year, the mileage, the options, and the condition of the vehicle 12, or the like, as well as combinations thereof. Additionally or alternatively, one or more communication beacons 18 may be programmed or configured to include one or more pointers, such as universal resource locators (URLs) or the like, which include information about discounted insurance rates, special financing deals, limited time deals, and the like. In some cases, this information may apply to more than one vehicle 12.

The communication beacon 18 may function as follows. At a frequency of, for example, 1 Hertz (Hz) to 10 Hz, the communication beacon 18 may wirelessly transmit through the transceiver element 26 a packet of data, which includes, at the least, the UUID. The packet of data may also include vehicle information, one or more pointers, or a combination of both. In some embodiments, the software application 24 executing on the mobile electronic device 22 may receive just the UUID and may transmit a reply that queries the communication beacon 18 for additional information, such as the vehicle information or any relevant pointers. The communication beacon 18 may then comply with the request and transmit additional information. In other embodiments, the packet of data may include information in addition to the UUID. The software application 24 may receive all of the information and not require anything else from the communication beacon 18.

The vehicle control system 20 may generally provide control of the electronic components of the vehicle 12. Most vehicles 12 may include at least a simple vehicle control system 20 that provides control of components such as dashboard displays, the heating and air conditioning system, and the audio system. Vehicle control systems 20 that fall within the scope of the present invention may generally include a transceiver element 32, a memory element 34, and a processing element 36, seen in FIG. 4 and all substantially similar in structure and basic to the like-named components for the communication beacon 18. The vehicle control system 20 may also include sensors 38, for example, in one or more seats to measure weight, accelerometers 40 to measure speed or acceleration of the vehicle 12, and the like to detect trigger events. Furthermore, the vehicle control system 20 may have Bluetooth® or similar wireless communication protocol capability.

In a similar fashion to the communication beacon 18, the vehicle control system 20 may be programmed to include a UUID along with vehicle information, one or more pointers, or a combination of both. During operation, in some embodiments, the vehicle control system 20 may repeatedly transmit the UUID and optionally, the vehicle information or the pointers. The software application 24 executing on the mobile electronic device 22 may respond in the same fashion as discussed above with the communication beacon 18. In other embodiments, the vehicle control system 20 may be programmed or configured to transmit the UUID, at the least, when a trigger event occurs. The trigger event may include the customer sitting in the driver's seat, starting the engine, driving at a certain speed, opening a driver's side or other door, shutting a door, adjusting vehicle controls/ settings (e.g., mirrors, seat, steering wheel, etc.), or the like. Additionally or alternatively, the trigger event may be that the customer's mobile electric device 22 comes within Bluetooth® or Near Field Communication (NFC) (or other wireless communication or data transmission technique) range of the vehicle control system 20 or communication beacon 18, or is otherwise detected by the vehicle control system 20 or communication beacon 18, or determined to be near or in close proximity to the vehicle for a sustained period of time, such as a minute or two. Further exemplary trigger events may be generated from and/or based upon (1) the vehicle's built in features (e.g., seat, door, or speed sensors); (2) an external communication beacon placed or positioned within the vehicle (e.g., an iBeacon with an accelerometer or other sensor); (3) a mobile device, such as a smart phone (i.e., GPS data that includes speed information); and/or other triggers, including those discussed elsewhere herein. Once the trigger event occurs, the software application 24 may receive the UUID and other information, if transmitted.

The mobile electronic device 22 may be embodied by a smart watch, a smart phone, a personal digital assistant (PDA), a tablet, a palmtop or laptop computer, or other mobile device, and is typically carried by the customer while he is shopping for a vehicle. The mobile electronic device 22 may include a transceiver element 42, a memory element 44, and/or a processing element 46, seen in FIG. 5 and all similar in structure and basic function to the like-named components for the communication beacon 18 and the vehicle control system 20. Specifically for the mobile electronic device 22, the memory element 44 may store the software application 24 and the processing element 46 may execute the software application 24.

The mobile electronic device 22 may function as follows. Bluetooth®, or similar protocol, communication on the mobile electronic device 22 may be enabled and the software application 24 may be executing while the customer is browsing and walking in the vicinity of the vehicles 12. The software application 24 may receive and send data, as described in more detail below, through the transceiver element 42 of the mobile electronic device 22.

The software application 24 may generally control the behavior of the mobile electronic device 22 when the device 22 is interacting with the communication beacon 18 or the vehicle control system 20 and the servers 16. The software application 24 may receive at least the UUID from the communication beacon 18 or the vehicle control system 20. In some embodiments, the software application 24 may rely on Bluetooth® pairing to initiate communication with the communication beacon 18 or the vehicle control system 20. The software application 24 may respond by transmitting a query to the communication beacon 18 or the vehicle control system 20 to send additional information. If the communication beacon 18 or the vehicle control system 20 transmits vehicle information, or if the vehicle information was originally transmitted with the UUID, then the software application 24 may transmit the vehicle information to the appropriate computer server 16. The computer server 16 may receive the information and may apply business methods or algorithms, may utilize lookup tables or databases, or combinations thereof to determine insurance rates or premiums (and/or discounts), terms of a loan (e.g., amount, term, interest rate, monthly payments, etc.), or both. The computer server 16 may then transmit the determined information to the software application 24. The software application 24 may display the insurance rates, loan terms, or both on a screen of the mobile electronic device 22. The software application 24 may further provide the customer with the option of accepting the quote for the insurance or loan, modifying the terms of the insurance or loan, saving the information, or the like.

If the communication beacon 18 or the vehicle control system 20 transmits pointer information about special deals, or if the pointer information was originally transmitted with the UUID, then the software application 24 may transmit the pointer to a web browser or other html viewer. The web browser may then display the webpage pointed to by the pointer, wherein the webpage may include information about discounted insurance rates, special financing deals, limited time deals, and the like.

The system 10 may operate as follows. The insurance and/or financial institution may procure a plurality of communication beacons 18 which are programmed or configured to include information about an associated vehicle 12 or pointers to special deals. Alternatively or additionally, the insurance and/or financial institution may program or configure the vehicle control system 20 of one or more vehicles for sale to include information about the vehicle 12 or pointers to special deals. Once the communication beacons 18 are placed in or on the vehicles, or the vehicles with their vehicle control systems 20 properly programmed are positioned, customers may browse the vehicles in a showroom or parking lot. Each customer may carry a mobile electronic device 22 with Bluetooth®, or similar protocol, communication enabled and the software application 24 executing.

As the customer walks among the vehicles, the mobile electronic device 22 may enter the communication range of one or more communication beacons 18 which are periodically transmitting information. The software application 24 may receive the transmission from the communication beacon 18 and may transmit information about the particular vehicle to one or more servers 16. The server 16 may process the information about the vehicle and may respond to the software application 24 with information regarding insurance rates, loan terms, or both. The software application 24 may display the information to the customer and may provide an option for the customer to respond to the offers of insurance and/or financing. If the communication beacons 18 transmit pointers, then the software application 24 may open a web browser and transfer the pointer thereto. The web browser may then display information to the customer.

In other embodiments, as the customer walks among the vehicles, the mobile electronic device 22 may enter the communication range of one or more vehicle control systems 20, which may transmit information in the same fashion as discussed above with the software application 24 responding in the same fashion as well. Alternatively, the vehicle control system 20 may be programmed or configured to transmit information to the mobile electronic device 22 only when a trigger event occurs, such as the customer sitting in the driver's seat, starting the engine, driving at a certain speed, or the like, or that the customer's mobile device moves within a proximity to the vehicle or a communications beacon, such as within Bluetooth® or Near Field Communication range. In some embodiments, trigger events may be detected (and associated wireless communication may be generated by) a customer's mobile device, the vehicle control system, and/or a communication beacon (such as a communication beacon with sensors and/or a GPS unit for speed monitoring and vehicle movement determination). Once the trigger event occurs, the software application 24 may receive the information and may respond as discussed above.

In one aspect, each mobile device 22 may be configured to communicate with one another directly via peer-to-peer (P2P) wireless communication and/or data transfer. In other aspects, each mobile device 22 may be configured to communicate indirectly with one another and/or any suitable device via communications over network 14, such as external computing server 16, vehicle control system 20, and/or communication beacon 18, for example. In still other aspects, each mobile device may be configured to communicate directly and indirectly with one and/or any suitable device, which may be concurrent communications or communications occurring at separate times.

Each mobile device 22 may be configured to send data to and/or receive data from one another and/or via network 14 using one or more suitable communication protocols, which may be the same communication protocols or different communication protocols as one another. To provide an example, mobile devices 22 may be configured to communicate with one another via a direct radio link (or radio wave or radio frequency link), which may utilize, for example, a Wi-Fi direct protocol, an ad-hoc cellular communication protocol, etc. Furthermore, mobile devices 22 may be configured to communicate with the vehicle on-board computers located in vehicles 12, respectively, utilizing a BLUETOOTH communication protocol (radio link(s) not shown).

To provide additional examples, mobile devices 22 may be configured to communicate with one another via radio links by each communicating with network 14 utilizing a cellular communication protocol. As an additional example, mobile devices 22 may be configured to communicate with external computing devices or servers 16 via radio links, such as wireless communication radio links or frequencies.

Mobile computing or electronic devices 22 may be configured to execute one or more algorithms, programs, applications, etc., to determine a geographic location of each respective mobile device 22 (and thus their associated vehicle) and/or vehicle data, and broadcast the geographic data and/or vehicle data via their respective radio links, to receive the geographic data and/or vehicle data via their respective radio links, and/or to display information based upon the geographic data and/or vehicle data.

Network 14 may be implemented as any suitable network configured to facilitate communications between mobile devices 22, computer servers 16, communication beacons 18, and vehicle controllers 20. For example, network 14 may include one or more telecommunication networks, nodes, and/or links used to facilitate data exchanges between one or more devices, and may facilitate a connection to the Internet for devices configured to communicate with network 14. Network 14 may include any suitable number of interconnected network components that form an aggregate network system, such as dedicated access lines, plain ordinary telephone lines, satellite links, cellular base stations, a public switched telephone network (PSTN), etc., or any suitable combination thereof. Network 14 may include, for example, a proprietary network, a secure public internet, a mobile-based network, a virtual private network, etc.

In aspects in which network 14 facilitates a connection to the Internet, data communications may take place over the network 14 via one or more suitable Internet communication protocols. For example, network 14 may be implemented as a wireless telephony network (e.g., GSM, CDMA, LTE, etc.), a Wi-Fi network (e.g., via one or more IEEE 802.11 Standards), a WiMAX network, a Bluetooth network, etc. Thus, radio or radio wave links may represent wired links, wireless links, or any suitable combination thereof.

External computing server(s) 16 may be configured to execute various software applications, algorithms, and/or other suitable programs. External computing server 16 may be implemented as any suitable type of device to facilitate the functionality as described herein. For example, external computing server 16 may be implemented as a network server, a web-server, a database server, one or more databases and/or storage devices, or any suitable combination thereof.

In one aspect, external computing server 16 may additionally or alternatively be part of an insurer computing system (or facilitate communications with an insurer computer system), and as such may access insurer databases, execute algorithms, execute applications, access remote servers, communicate with remote processors, etc., as needed to perform insurance-related functions. For example, external computing server 16 may cause data associated with the vehicle information discussed herein, vehicle features or ratings, vehicle pricing, insurance pricing, and/or vehicle loan offers to be transmitted to mobile devices 22. External server 16 may also facilitate the receipt of telematics data or other data from one or more mobile computing devices 22, which may be associated with insurance customers and/or running a telematics application thereon.

In aspects in which external computing server 16 facilitates communications with an insurer computing system (or is part of such a system), data received from one or more mobile electronic or computing devices 22 may include logon credentials which may be verified by external computing server 16 or one or more other external computing devices, servers, etc. These logon credentials may be associated with an insurer profile, which may include, for example, insurance policy numbers, a description and/or listing of insured assets, vehicle identification numbers of insured vehicles, addresses of insured structures, contact information, premium rates, discounts, etc.

In this way, data received from one or more mobile devices 22 may allow external computing server 16 to uniquely identify each insured customer and/or whether each identified insurance customer has installed the telematics or other type of mobile device application. Furthermore, any data collected, with customer permission or affirmative consent, from one or more mobile devices 22 may be referenced to each insurance customer and/or any insurance policies associated with each insurance customer for various insurance-related purposes.

First Exemplary Computer-Implemented Method

Figure 6:
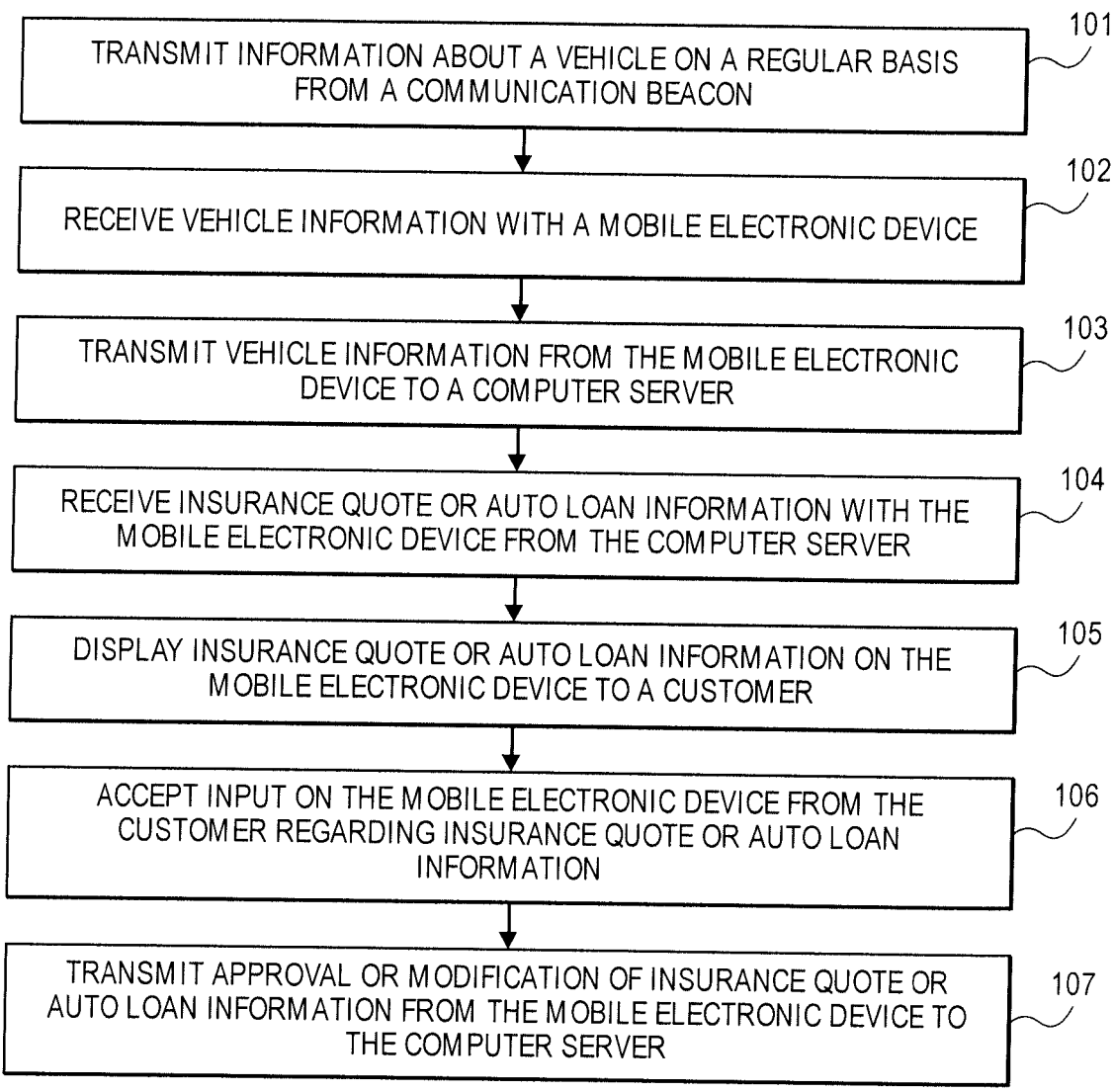
FIG. 6 illustrates at least a portion of the steps of a first exemplary computer-implemented method for transmitting and receiving vehicle, insurance, and/or financial information.

FIG. 6 depicts a listing of steps of a first exemplary computer-implemented method 100 for transmitting and receiving vehicle, insurance, and/or financial data. The steps may be performed in the order shown in FIG. 6, or they may be performed in a different order. Furthermore, some steps may be performed concurrently as opposed to sequentially. In addition, some steps may be optional. The steps of the computer-implemented method 100 may be performed by the system 10, with a first portion of the steps being performed by the communication beacon 18 and a second portion of the steps being performed by the mobile electronic device 22.

Referring to step 101, information about a vehicle 12 may be transmitted on a regular basis from a communication beacon 18. The vehicle 12 may be new or used and of any type. The information may include the VIN, the make, the model, the year, the mileage, the options, and the condition of the vehicle 12, or the like, as well as combinations thereof. The communication beacon 18 may be embodied by a Bluetooth® beacon or an iBeacon®, and may include a transceiver element 26 for communicating with mobile electronic devices 22, a memory element 28 for storing vehicle information, and/or a processing element 30 for controlling the operation of the communication beacon 18. The communication beacon 18 may be programmed or configured to include the vehicle information by an insurance carrier and/or a financial institution. One or more communication beacons 18 may be placed on, in, or within a few feet of each associated vehicle 12. The vehicle information may be transmitted by the communication beacon 18 using Bluetooth® or a similar communication protocol.

Referring to step 102, the vehicle information may be received with a mobile electronic device 22. The mobile electronic device 22 may be embodied by a smart watch, a smart phone, a personal digital assistant (PDA), a tablet, a palmtop or laptop computer, or the like, and is typically carried by the customer while he is shopping for a vehicle. The mobile electronic device 22 may include a transceiver element 42 for communicating with external systems or devices, a memory element 44 for storing data, and/or a processing element 46 for executing a software application 24.

Referring to step 103, the vehicle information may be transmitted from the mobile electronic device 22 to a computer server 16, which may be owned or accessed by an insurance or financial institution. The computer server 16 may receive the information and may apply business methods or algorithms, may utilize lookup tables or databases, or combinations thereof to determine insurance rates or premiums, terms of a loan, or both. The computer server 16 may then transmit the determined information to the software application 24.

Referring to steps 104 and 105, the information regarding an insurance quote or auto loan may be received by the mobile electronic device 22. The information may also be displayed on a screen of the mobile electronic device 22 for the customer to view. The customer may review the terms of the insurance quote or auto loan and may wish to approve or modify the terms. Alternatively, the customer may simply save the information for viewing at a later time.

Referring to steps 106 and 107, input from the customer may be accepted on the mobile electronic device 22 regarding the insurance quote or auto loan. The input may include approval or modification of the terms. The approval or modification is transmitted from the mobile electronic device 22 to the computer server 16. The method 100 may include additional, less, or alternate actions, including those discussed elsewhere herein, and/or may be implemented via a computer system, communication network, one or more processors or servers (e.g., communication beacons, vehicle control/communication systems, mobile devices, and/or remote servers), and/or computer-executable instructions stored on non-transitory storage media or computer readable medium.

Second Exemplary Computer-Implemented Method

Figure 7:
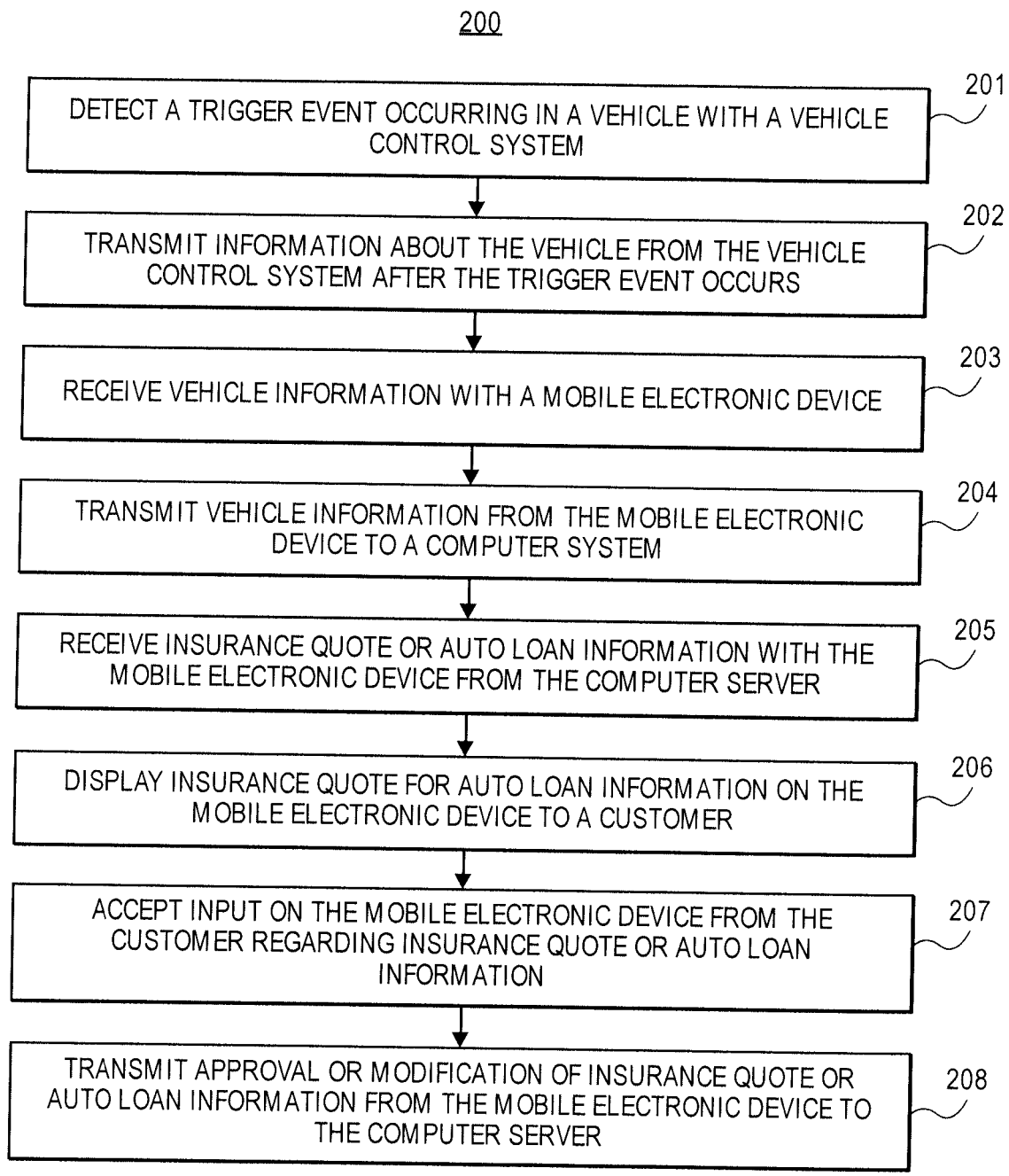
FIG. 7 illustrates at least a portion of the steps of a second exemplary computer-implemented method for transmitting and receiving vehicle, insurance, and/or financial information.

FIG. 7 depicts a listing of steps of a second exemplary computer-implemented method 200 for transmitting and receiving vehicle, insurance, and/or financial data. The steps may be performed in the order shown in FIG. 7, or they may be performed in a different order. Furthermore, some steps may be performed concurrently as opposed to sequentially. In addition, some steps may be optional. The steps of the computer-implemented method 200 may be performed by the system 10, with a first portion of the steps being performed by the vehicle control system 20 and a second portion of the steps being performed by the mobile electronic device 22.

Referring to step 201, a trigger event may be detected which may occur in a vehicle 12 with a vehicle control system 20. The vehicle 12 may be new or used and of any type. The trigger event may include actions such as the customer sitting in the driver's seat, starting the engine, driving at a certain speed, adjusting a mirror or seat, adjusting the radio, or the like. The vehicle control system 20 generally may provide control of the electronic components of the vehicle 12, and/or may include a transceiver element 32 for communicating with mobile electronic devices 22, a memory element 34 for storing vehicle information, and/or a processing element 36 for controlling the operation of the vehicle control system 20. The vehicle control system 20 may also include sensors 38, accelerometers 40, and the like to detect trigger events.

Further exemplary trigger events may be generated from and/or based upon (1) the vehicle's built in features (e.g., seat, door, engine, mirror, or speed sensors); (2) an external communication beacon placed or positioned within the vehicle (e.g., an iBeacon with an accelerometer or other sensor); (3) a mobile device, such as a smart phone (i.e., GPS data that includes speed information); and/or other triggers, including those discussed elsewhere herein.

Referring to step 202, information about the vehicle 12 may be transmitted by the vehicle control system 20 after the trigger event occurs. The information may include the VIN, the make, the model, the year, the mileage, the options, and the condition of the vehicle 12, or the like, as well as combinations thereof. The vehicle control system 20 may be programmed or configured to include the vehicle information by an insurance carrier and/or a financial institution. The vehicle information may be transmitted by the vehicle control system 20 using Bluetooth® or a similar communication protocol. One or more sensors 38 or accelerometers 40 may detect one or more trigger events and may signal the processing element 36 that the trigger event has occurred. The processing element 36 may then transmit the vehicle information through the transceiver element 32.

Referring to step 203, the vehicle information may be received with a mobile electronic device 22. The mobile electronic device 22 may be embodied by a smart watch, a smart phone, a personal digital assistant (PDA), a tablet, a palmtop or laptop computer, or the like, and is typically carried by the customer while he is shopping for a vehicle. The mobile electronic device 22 may include a transceiver element 42 for communicating with external systems or devices, a memory element 44 for data storage, and a processing element 46 for executing a software application 24.

Referring to step 204, the vehicle information may be transmitted from the mobile electronic device 22 to a computer server 16, which may be owned or accessed by an insurance or financial institution. The computer server 16 may receive the information and may apply business methods or algorithms, may utilize lookup tables or databases, or combinations thereof to determine insurance rates or premiums, terms of a loan, or both. The computer server 16 may then transmit the determined information to the software application 24.

Referring to steps 205 and 206, the information regarding an insurance quote or auto loan may be received by the mobile electronic device 22. The information may also be displayed on a screen of the mobile electronic device 22 for the customer to view. The customer may review the terms of the insurance quote or auto loan and may wish to approve or modify the terms. Alternatively, the customer may simply save the information for viewing at a later time.

Referring to steps 207 and 208, input from the customer may be accepted on the mobile electronic device 22 regarding the insurance quote or auto loan. The input may include approval or modification of the terms. The approval or modification may be transmitted from the mobile electronic device 22 to the computer server 16. The method 200 may include additional, less, or alternate actions, including those discussed elsewhere herein, and/or may be implemented via a computer system, communication network, one or more processors or servers (e.g., communication beacons, vehicle control/communication systems, mobile devices, and/or remote servers), and/or computer-executable instructions stored on non-transitory storage media or computer readable medium.

Third Exemplary Computer-Implemented Method

Figure 8:
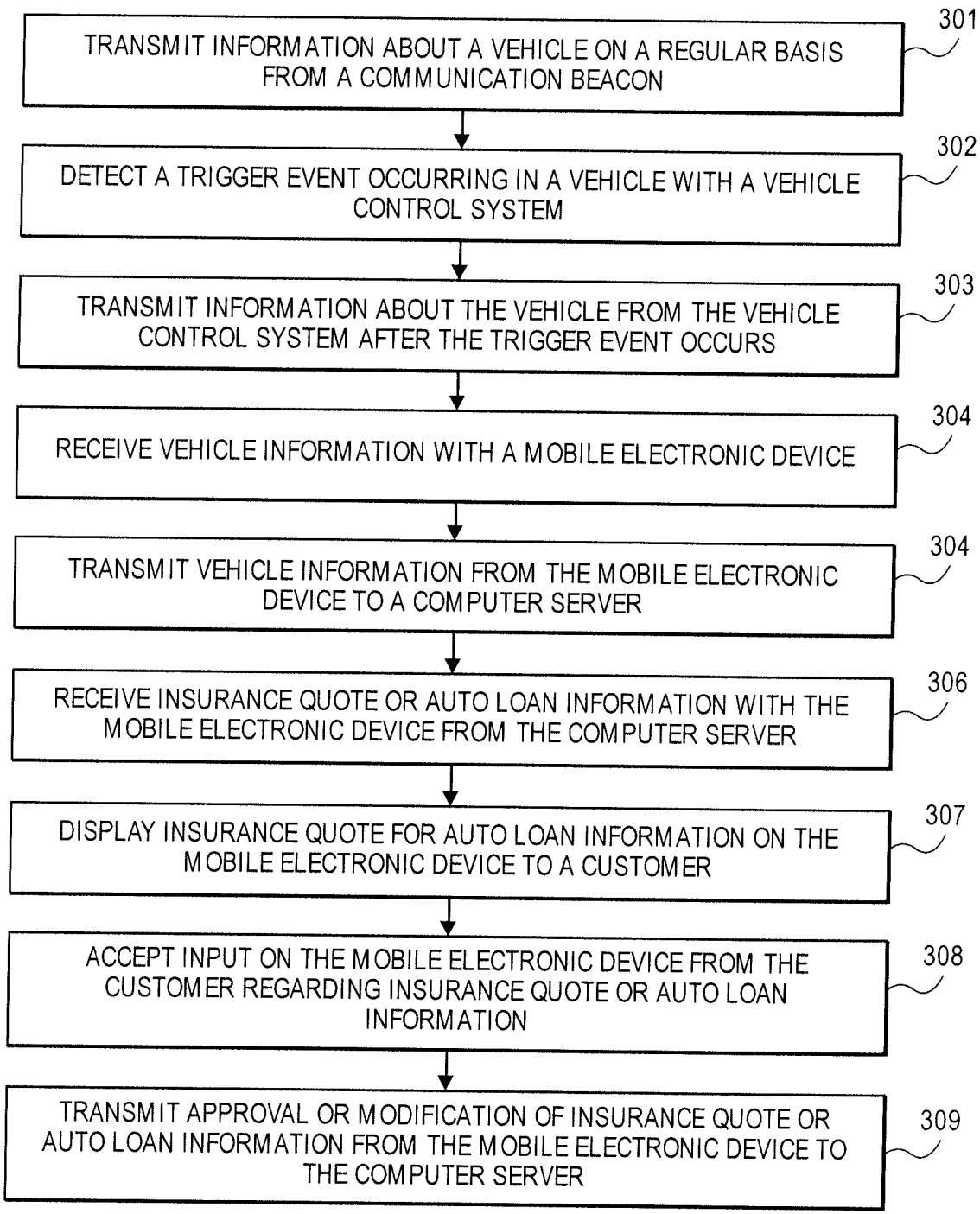
FIG. 8 illustrates at least a portion of the steps of a third exemplary computer-implemented method for transmitting and receiving vehicle, insurance, and financial information.

FIG. 8 depicts a listing of steps of an exemplary computer-implemented method 300 for transmitting and receiving vehicle, insurance, and/or financial data. The steps may be performed in the order shown in FIG. 8, or they may be performed in a different order. Furthermore, some steps may be performed concurrently as opposed to sequentially. In addition, some steps may be optional. The steps of the computer-implemented method 300 may be performed by the system 10, with a first portion of the steps being performed by the communication beacons 18, a second portion of the steps being performed by the vehicle control system 20, and a third portion of the steps being performed by the mobile electronic device 22.

Referring to step 301, information about a vehicle 12 may be transmitted on a regular basis from a communication beacon 18. The vehicle 12 may be new or used and of any type. The information may include the VIN, the make, the model, the year, the mileage, the options, and the condition of the vehicle 12, or the like, as well as combinations thereof. The communication beacon 18 may be embodied by a Bluetooth® beacon or an iBeacon®, and may include a transceiver element 26 for communicating with mobile electronic devices 22, a memory element 28 for storing vehicle information, and/or a processing element 30 for controlling the operation of the communication beacon 18. The communication beacon 18 may be programmed or configured to include the vehicle information by an insurance carrier and/or a financial institution. One or more communication beacons 18 may be placed on, in, or within a few feet of each associated vehicle 12. The vehicle information may be transmitted by the communication beacon 18 using Bluetooth® or a similar communication protocol.

Referring to step 302, a trigger event may be detected which may occur in the vehicle 12 with a vehicle control system 20. The trigger event may include actions such as the customer sitting in the driver's seat, starting the engine, driving at a certain speed, adjusting a seat or mirror to account for the driver's height, opening or closing vehicle doors, or the like. The vehicle control system 20 generally may provide control of the electronic components of the vehicle 12, and/or may include a transceiver element 32 for communicating with mobile electronic devices 22, a memory element 34 for storing vehicle information, and/or a processing element 36 for controlling the operation of the vehicle control system 20. The vehicle control system 20 may also include sensors 38, accelerometers 40, and the like to detect trigger events.

Referring to step 303, information about the vehicle 12 may be transmitted by the vehicle control system 20 after the trigger event occurs. The information may include the VIN, the make, the model, the year, the mileage, the options, and the condition of the vehicle 12, or the like, as well as combinations thereof. The vehicle control system 20 may be programmed or configured to include the vehicle information by an insurance carrier and/or a financial institution. The vehicle information may be transmitted by the vehicle control system 20 using Bluetooth® or a similar communication protocol. One or more sensors 38 or accelerometers 40 may detect one or more trigger events and may signal the processing element 36 that the trigger event has occurred. The processing element 36 may then transmit the vehicle information through the transceiver element 32.

Referring to step 304, the vehicle information may be received with a mobile electronic device 22. The mobile electronic device 22 may be embodied by a smart watch, a smart phone, a personal digital assistant (PDA), a tablet, a palmtop or laptop computer, or the like, and may be typically carried by the customer while he is shopping for a vehicle. The mobile electronic device 22 may include a transceiver element 42 for communicating with external systems or devices, a memory element 44 for data storage, and/or a processing element 46 for executing a software application 24. The vehicle information may be received from either a communication beacon 18, a vehicle control system 20, or both.

Referring to step 305, the vehicle information may be transmitted from the mobile electronic device 22 to a computer server 16, which may be owned or accessed by an insurance or financial institution. The computer server 16 may receive the information and may apply business methods or algorithms, may utilize lookup tables or databases, or combinations thereof to determine insurance rates or premiums, terms of a loan, or both. The computer server 16 may then transmit the determined information to the software application 24.

Referring to steps 306 and 307, the information regarding an insurance quote or auto loan may be received by the mobile electronic device 22. The information may also be displayed on a screen of the mobile electronic device 22 for the customer to view. The customer may review the terms of the insurance quote or auto loan and may wish to approve or modify the terms. Alternatively, the customer may simply save the information for viewing at a later time.

Referring to steps 308 and 309, input from the customer may be accepted on the mobile electronic device 22 regarding the insurance quote or auto loan. The input may include approval or modification of the terms. The approval or modification may be transmitted from the mobile electronic device 22 to the computer server 16. The method 300 may include additional, less, or alternate actions, including those discussed elsewhere herein, and/or may be implemented via a computer system, communication network, one or more processors or servers (e.g., communication beacons, vehicle control/communication systems, mobile devices, and/or remote servers), and/or computer-executable instructions stored on non-transitory storage media or computer readable medium.

Exemplary System for Transmitting and Receiving Vehicle, Insurance, and Financial Data In a first aspect, a system for transmitting and receiving vehicle, insurance, and/or financial data may be provided. The system may comprise at least one communication beacon, at least one vehicle control system, and a mobile electronic device. The communication beacon may be associated with one of a plurality of vehicles, and/or may transmit information about the associated vehicle. The vehicle control system may be associated with one of a plurality of vehicles. The communication beacon and/or vehicle control system (and/or even the mobile electronic device) may be Bluetooth® enabled, may include various sensors to detect trigger events, and/or may be configured to transmit information about the associated vehicle after a trigger event occurs. The communication beacon, vehicle control system, and/or mobile electronic device may include various sensors that detect and/or generate a trigger event, such as sound, speed, motion, or weight sensors that detect people within or in the vicinity of the vehicle. The mobile electronic device may include a communication element, a memory element, and/or a processing element which executes a software application. The software application may be configured to receive vehicle information from the communication beacon or the vehicle control system, transmit the vehicle information to a computer server, receive term information regarding an insurance quote or auto loan, the term information determined by the computer server based upon the vehicle information, and/or display the term information on a screen (such as a display associated with the mobile electronic device, vehicle control system, or even the communication beacon itself) to a customer. The system may include additional, fewer, or alternate components and/or functionality, including that discussed elsewhere herein.

For instance, the software application may be further configured to accept input from the customer to approve or modify the term information and transmit the input from the customer to the computer server. The vehicle control system may include a sensor positioned in a seat of the associated vehicle configured to determine when the customer is sitting on the seat, and/or an accelerometer configured to determine when the customer drives the associated vehicle at a certain speed. The vehicle control system may include door mounted sensors to detect when a vehicle door is opened and/or closed, and/or one or more sensors mounted on adjustable items within or on the vehicle, such as mirrors, seats, entertainment systems, steering wheels, etc. The sensors may detect when the adjustable items are adjusted, such as a mirror, steering wheel, or seat height being adjusted by the customer to account for their height or size before vehicle operation. The indications detected or otherwise determined by the sensors and/or accelerometer may be used by the vehicle control system or other processor(s) as a trigger event as explained and used herein.

The communication beacon may be positioned in or on the associated vehicle. In some embodiments, the communication beacon itself may detect and/or generate trigger events and/or trigger event data. For instance, the communication beacon may have a motion sensor to detect nearby movement of customers looking at a new vehicle, an infrared sensor to detect people, a sound sensor to detect speech, an accelerometer to detect vehicle movement or speed above a certain threshold, and/or other sensors that may provide an indication that customer is looking at, or otherwise interested in purchasing, a new or other vehicle. In another embodiment, a communication beacon that is Bluetooth® enabled and includes an accelerometer and/or other sensors that detect trigger events may be considered to be a vehicle control system.

As another exemplary trigger event, the vehicle control system and/or communication beacon may recognize that a mobile device is within broadcast range, such as by detecting various transmissions or signals originating from the mobile device, or signal strength determinations. The broadcast range may be a Bluetooth® broadcast or a Near Field Communication broadcast in one embodiment.

Exemplary Computer-Implemented Method for Transmitting and Receiving Vehicle, Insurance, and Financial Data In another aspect, a computer-implemented method for may be provided. The method may include: (1) transmitting information about a vehicle on a regular basis from a communication beacon; (2) detecting a trigger event occurring in a vehicle with a vehicle control system; (3) transmitting information about the vehicle from the vehicle control system after the trigger event occurs; (4) receiving vehicle information with a mobile electronic device; (5) transmitting vehicle information from the mobile electronic device to a computer server; (6) receiving insurance quote or auto loan information with the mobile electronic device from the computer server; and/or (7) displaying insurance quote or auto loan information on the mobile electronic device to a customer.

The method may include additional, fewer, or alternative actions, including those discussed elsewhere herein, and/or may be implemented via a computer system, communication network, one or more processors or servers (e.g., communication beacons, vehicle control/communication systems, mobile devices, and/or remote servers), and/or computer-executable instructions stored on non-transitory storage media or computer readable medium. For instance, the method may include: accepting input from the customer to approve or modify the term information and transmitting the input from the customer to the computer server.

Exemplary Embodiments

Vehicle-mounted beacons and smart vehicle controllers (which may include a factory installed and/or embedded Bluetooth® device) may transmit vehicle information to mobile devices of customers interested in purchasing a new vehicle. When a customer is in the vicinity of a new vehicle, their mobile device may receive a broadcast, such as a Bluetooth® broadcast, of vehicle information from the new vehicle controller or a beacon mounted within, or on, the new vehicle. The mobile device may in turn transmit that vehicle information to an insurance or financial services provider remote server. The remote server may transmit quotes for vehicle insurance or offers for vehicle financing or loans to the mobile device for the customer's review. The customer may accept the offer for vehicle insurance or financing using their mobile device. In some embodiments, the vehicle information broadcast may be initiated when it is determined (such as by a trigger event) that mobile device is in or near the vehicle—indicating potential customer interest in purchasing the vehicle.

The present embodiments may provide several advantages over conventional techniques. For instance, the present embodiments may facilitate (1) using Bluetooth® beacons to broadcast vehicle information to car or other vehicle shoppers; (2) providing real time quotes at vehicle dealerships; and/or (3) providing and comparing quotes for vehicles where the user is in or near (the user may not need to manually select a vehicle). Other benefits may be provided, including those discussed elsewhere herein.

In some embodiments, the present embodiments may provide useful information to insurance providers, and/or insurance agents or insurance provider representatives. The beacons and/or new vehicles may have certain vehicle information pre-programmed with vehicle information and for broadcasting such vehicle information to customers interested in purchasing a new or different vehicle. For instance, the vehicle information may include consumer ratings or consumer satisfaction information. The vehicle information may include vehicle year, make, model, year, mileage, gas mileage, customer rating, safety rating, feature information, and/or other vehicle information.

The present embodiments may be associated with employing, or wirelessly interconnected with, a mobile device (e.g., smart phone, tablet, laptop, computing device, smart watch or bracelet, smart glasses, personal digital assistant (PDA), pager, other computing device configured for wireless communication or data transmission) associated with an existing customer or insurance policyholder. The existing customer or insurance policyholder may opt-in to a program where they elect to receive push notifications regarding new vehicles, new vehicle offers, insurance-related information or quotes, vehicle loan offers or quotes, and/or other information, including the information discussed elsewhere herein (such as opting into such a program when the customer is in the market for a new vehicle). Such optional opt-in programs may be offered by vehicle dealerships, insurance providers, financial services providers (or banks), or other third parties.

In some embodiments, a mobile device associated with a customer or policyholder may detect, or otherwise determine, when it is near, or in the vicinity, of beacon—such as a new vehicle-mounted beacon—or capable of receiving a broadcast from a beacon. The beacon may be permanently or temporarily mounted on, or within, the new vehicle. The beacon may store vehicle information, such as Vehicle Identification Number (VIN), make/model/year information, mileage information, or other vehicle information, including that discussed elsewhere herein.

For instance, the mobile device (such as a mobile device associated with a customer shopping for a new or different vehicle as a vehicle dealership), may determine that the mobile device, and thus the customer, is within (i.e., seating in the driver's or passenger's seat of) the new or different vehicle. This determination may be used as an indication that the customer is interested in, or considering, purchasing the new or different vehicle.

In one embodiment, the customer may send a data transmission indicating that they are in the market for a new vehicle to their insurance provider and would like to receive such information—such as quotes for vehicle insurance or offers for vehicle loans. When the mobile device of the customer is near or within a new vehicle at a dealership, dealership promotions, deals, financing or other information may be pushed to the mobile device. Also, vehicle information may be pushed to the mobile device, such as from a vehicle controller transceiver and/or a vehicle-mounted beacon. Additionally or alternatively, the mobile device may receive information regarding pre-calculated insurance for the new vehicle for the customer, and/or comparison information comparing the new vehicle insurance quote with an existing vehicle insurance policy for the customer. The insurance information may be sent to the customer's mobile device and/or a computing device of an insurance agent that services the customer.

In one scenario, a mobile device may gather a list of vehicles (and associated vehicle information) that the customer has interest in or has viewed at several dealerships—each vehicle's information being transmitted to the mobile device from a vehicle controller or vehicle-mounted beacon as the customer views or test drives each respective vehicle. After which, the customer may access all of the vehicle information gathered for further review, and/or transmission from the mobile device to a remote server. The remote server may then calculate and transmit various offers for services and products back to the mobile device, such as offers or quotes for vehicle insurance and/or offers or quotes for vehicle financing or loans. The remote server may also transmit vehicle rating information back to the mobile device for the customer's review and consideration.

If the customer agrees to purchase the vehicle and accepts an offer for vehicle insurance, the remote server (such as an insurance provider remote server) may automatically cancel the existing or old insurance covering a trade-in vehicle (with the customer's permission). As such, the customer experience with vehicle purchasing may be enhanced.

Exemplary Computer-Implemented Method

Figure 9:
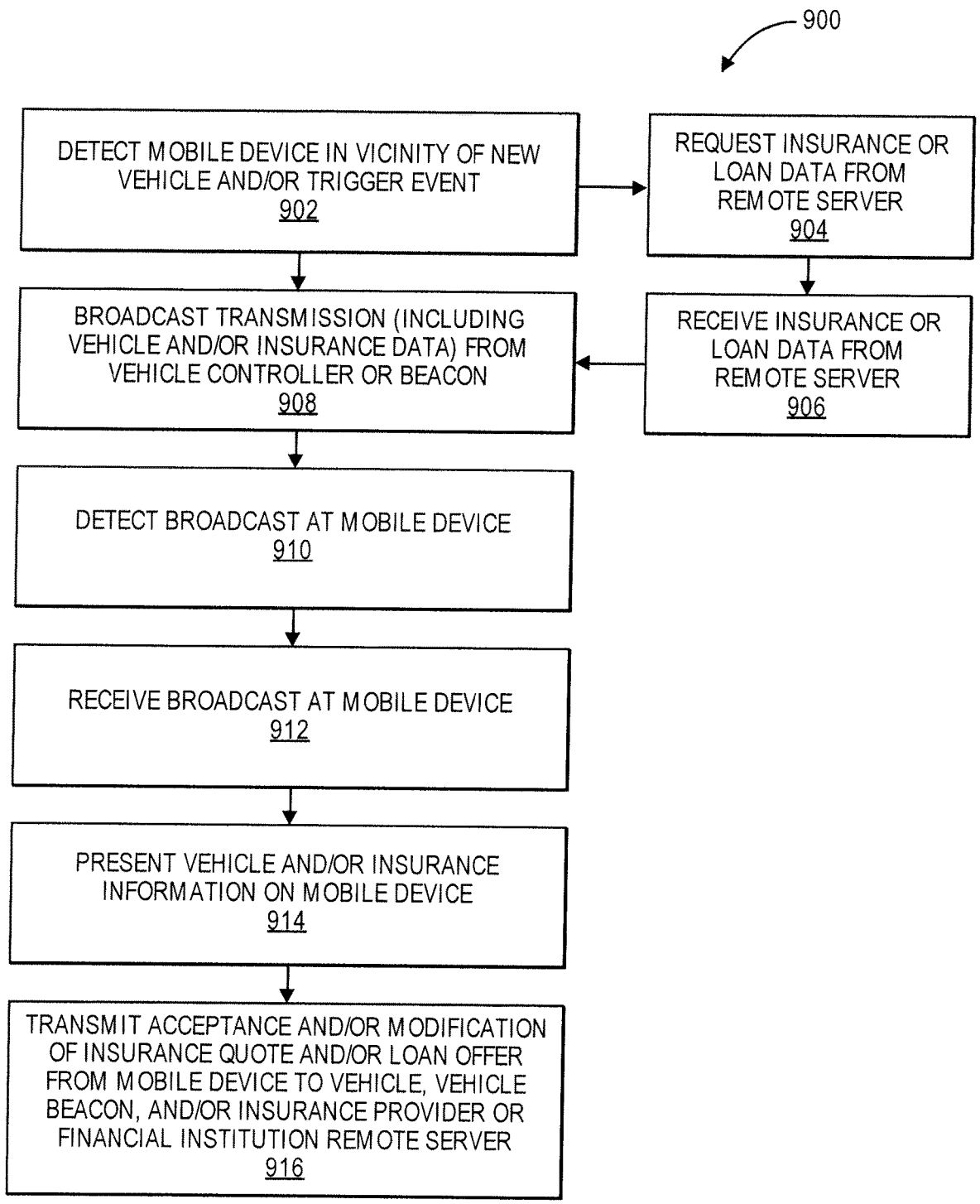
FIG. 9 illustrates an exemplary computer-implemented method for providing insurance quotes; loan offers; and/or insurance-related, financial-related, and/or other offers or services to existing customers at vehicle dealerships.

FIG. 9 illustrates an exemplary computer-implemented method for providing insurance quotes; loan offers; and/or insurance-related, financial-related, and/or other offers or services to existing customers at vehicle dealerships 900. The method 900 may include detecting that a mobile device is in the vicinity of a new vehicle and/or a trigger event 902; requesting and/or receiving insurance and/or loan data from a remote server 904, 906; broadcasting a data transmission (including vehicle and/or insurance data) from a vehicle controller or beacon 908; detecting the broadcast at the mobile device 910; receiving the broadcast at the mobile device 912; presenting vehicle and/or insurance information on a display of the mobile device 914; and/or transmitting acceptance and/or modification of an insurance quote and/or loan offer from the mobile device to the vehicle, vehicle-mounted beacon; and/or insurance provider or financial services provider remote server 916.

The method 900 may include detecting (i) that a mobile device is in the vicinity of a new vehicle and/or (ii) a trigger event 902. As an example, a vehicle controller or vehicle-mounted beacon may recognize that a mobile device is within broadcast range, such as by detecting various transmissions or signals originating from the mobile device. Additionally or alternatively, trigger events may be used to infer that a customer interested in a vehicle is physically within it, such as detecting operation of a vehicle door, vehicle seat, vehicle movement, operation or adjustment of a seat or mirror, indication that the vehicle is being driven (such as detected by the customer mobile device (e.g., using accelerometer or GPS speed information), or other triggers, including those mentioned elsewhere herein.

The method 900 may include requesting and/or receiving insurance and/or loan data from a remote server 904, 906. In one aspect, the vehicle controller or vehicle-mounted beacon may have previously been in wireless communication with a remote server, such as an insurance or financial services provider remote server. Vehicle information may be transmitted from the vehicle controller or vehicle-mounted beacon to the remote server, along with a request 904 for insurance or loan offers. The vehicle controller or vehicle-mounted beacon may then receive such offers 906 transmitted by the remote server after the remote server calculates or retrieves insurance or loan offers for the new vehicle based upon or associated with the vehicle information.

The method 900 may include broadcasting a data transmission (including vehicle and/or insurance data) from a vehicle controller or beacon 908. The vehicle controller or vehicle-mounted beacon may transmit or broadcast (a) the vehicle information, (b) the insurance offer or quote, and/or (c) offer for a vehicle loan to the mobile device after it is determined that the mobile device is within range, or a trigger event occurs.

The method 900 may include detecting the broadcast at the mobile device 910. The mobile device may determine or detect that is capable of receiving the broadcast or otherwise is within broadcast range (such as a low power broadcast range, a Bluetooth® range, Near Field Communication range, and/or other wireless data transmission or communication range) of the vehicle controller or vehicle-mounted beacon. After which, the method 900 may include receiving the broadcast at the mobile device 912. The mobile device may receive and store the broadcast into a memory unit.

The method 900 may include presenting vehicle and/or insurance information on a display of the mobile device 914. The (a) vehicle information, (b) the insurance offer or quote, and/or (c) offer for a vehicle loan may be presented on a display of the mobile device for the customer's review, modification, or approval.

The method 900 may include transmitting acceptance and/or modification of an insurance quote and/or loan offer from the mobile device to the vehicle, vehicle-mounted beacon; and/or insurance provider or financial services provider remote server 916. After which, the remote server may finalize the transaction, and wirelessly communication a confirmation of the transaction (such as the customer has acquired (i) vehicle insurance for the new vehicle, or (ii) financing for the new vehicle) to the customer's mobile device and/or a computing device of the dealership.

As a result, insurance quotes and loan offers may be provided to an existing customer or policyholder via wireless communication or data transmission. Additionally or alternatively, other insurance or financial services or products may be provided to the existing customer or provider, and/or insurance-related or financial-related transactions may be completed, enhancing the online customer experience. The method may include additional, less, or alternate actions, including those discussed elsewhere herein.

Another Exemplary Computer-Implemented Method

Figure 10:
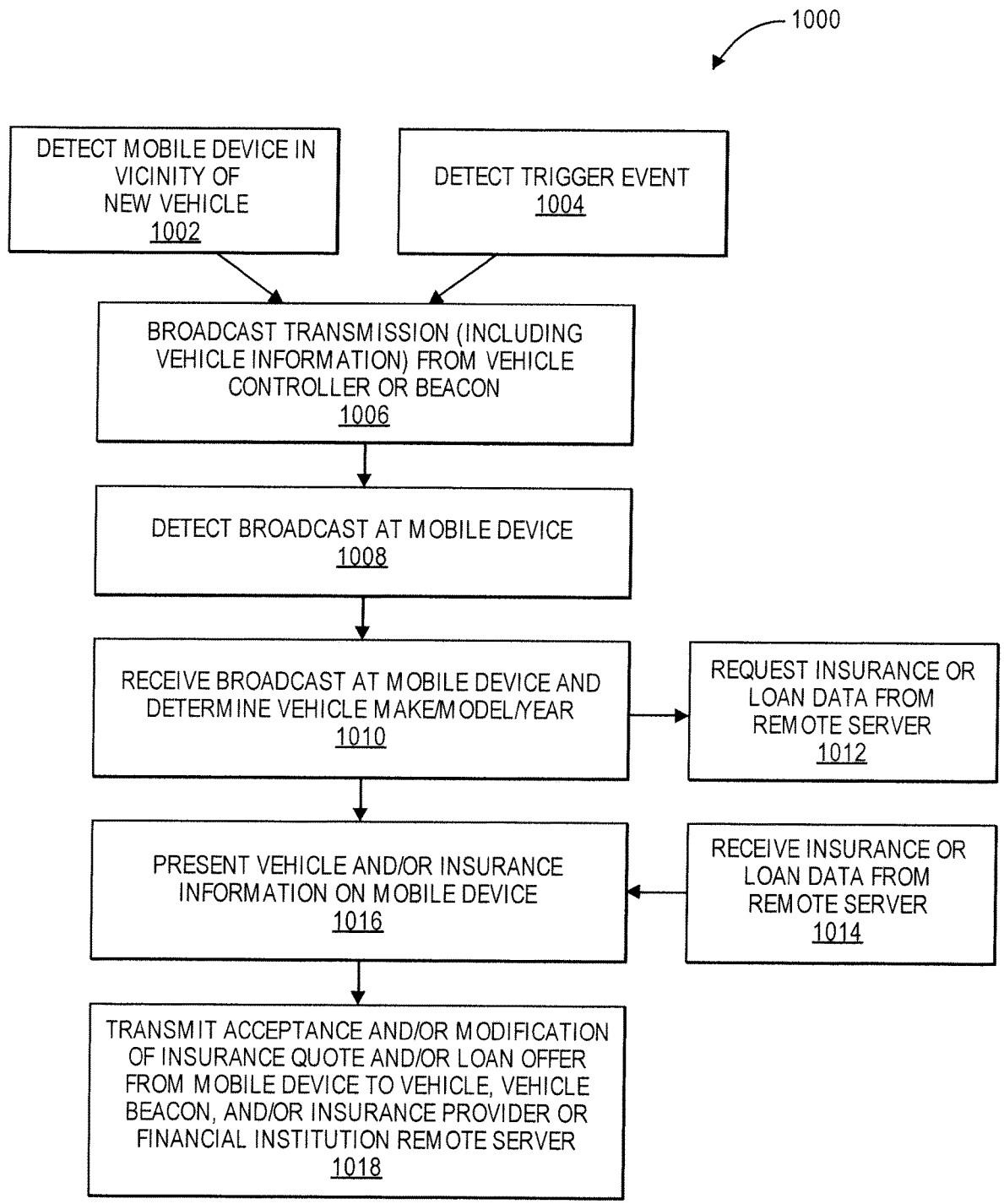
FIG. 10 illustrates another exemplary computer-implemented method for providing insurance quotes; loan offers; and/or insurance-related, financial-related, and/or other offers or services to existing customers at vehicle dealerships.

FIG. 10 illustrates another exemplary computer-implemented method for providing insurance quotes; loan offers; and/or insurance-related, financial-related, and/or other offers or services to existing customers at vehicle dealerships 1000. The method 1000 may include detecting that a mobile device is in the vicinity of a new vehicle 1002; detecting a trigger event 1004; broadcasting a data transmission (including vehicle and/or insurance data) from a vehicle controller or beacon 1006; detecting the broadcast at the mobile device 1008; receiving the broadcast at the mobile device 1010; requesting and receiving insurance and/or loan data from a remote server 1012, 1014; presenting the vehicle and/or insurance information on a display of the mobile device 1016; and/or transmitting acceptance and/or modification of an insurance quote and/or loan offer from the mobile device to the vehicle controller, vehicle-mounted beacon, and/or insurance provider or financial services provider remote server 1018.

The method 1000 may include detecting that a mobile device is in the vicinity of a new vehicle 1002. As one example, a mobile device may detect that is it in range of, or capable receiving, a broadcast from a vehicle controller or vehicle-mounted beacon. As another example, a vehicle controller or vehicle-mounted beacon may recognize that a mobile device is within broadcast range, such as by detecting various transmissions or signals originating from the mobile device.

Additionally or alternatively, the method 1000 may include detecting a trigger event 1004. The trigger event may be a door of the new vehicle being opened or shut (as determined by a door mounted sensor); someone sitting in the driver's seat of the vehicle (as determined by seat pressure sensor); the engine of the new vehicle starting (as determine by engine rpm); the new vehicle moving (as determined by an accelerometer); and/or other triggers, including those mentioned elsewhere herein.

The method 1000 may include broadcasting a data transmission including vehicle information from a vehicle controller or beacon 1006. The vehicle information may include several vehicle features and identification information, including the vehicle information mentioned elsewhere herein.

The method 1000 may include detecting the broadcast of vehicle information at the mobile device 1008. Once detected, the mobile device may receive and store the broadcast on a memory unit of the mobile device 1010.

After the broadcast and vehicle information (associated with a vehicle that the customer is interested in purchasing) is received by the mobile device, the mobile device in turn may transmit the vehicle information to a remote server 1012. The transmission may include a request for product offers based upon the vehicle information, such as insurance and/or loan offers.

The method 1000 may include receiving data from the remote server 1014. The data from the remote server may include insurance, financing, and/or other offers that the remote server determines or retrieves from a memory unit based upon the vehicle information originating from the vehicle controller and/or vehicle-mounted beacon.

The method 1000 may include presenting the vehicle and/or insurance information on a display of the mobile device 1016. The customer may review the offers, such as the offers for vehicle insurance or financing, and accept or modify the offers.

The method 1000 may include transmitting acceptance and/or modification of an insurance quote and/or loan offer from the mobile device to the remote server 1018. After which, the remote server may finalize the transaction, and wirelessly communication a confirmation of the transaction (such as the customer has acquired (i) vehicle insurance for the new vehicle, or (ii) financing for the new vehicle) to the customer's mobile device and/or a computing device of the dealership.

As a result, insurance quotes and loan offers may be provided to an existing customer or policyholder via wireless communication or data transmission. Additionally or alternatively, other insurance or financial services or products may be provided to the existing customer or provider, and/or insurance-related or financial-related transactions may be completed, enhancing the online customer experience. The method may include additional, less, or alternate actions, including those discussed elsewhere herein.

Another Exemplary Computer-Implemented Method

Figure 11:
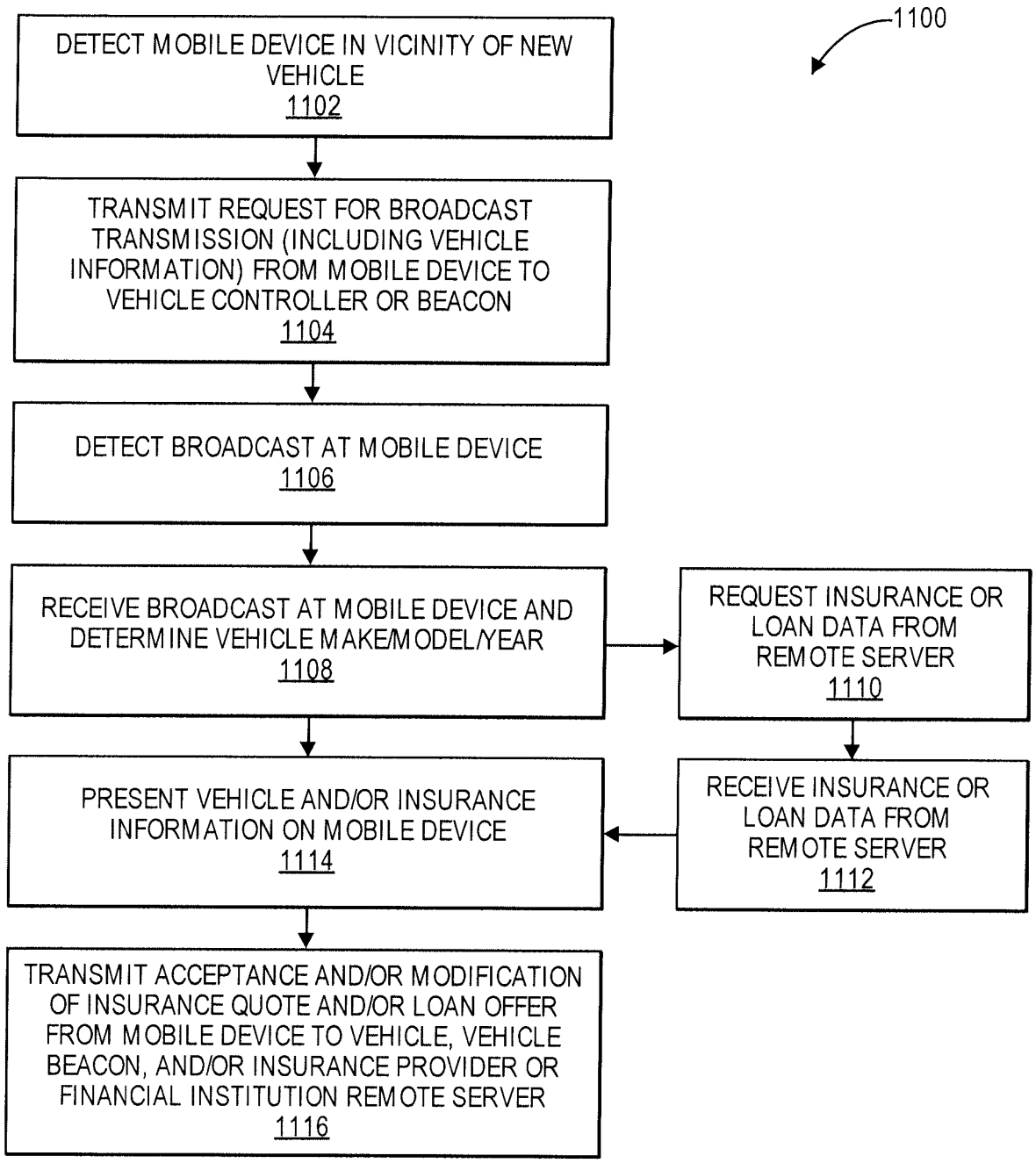
FIG. 11 illustrates another exemplary computer-implemented method for providing insurance quotes; loan offers; and/or insurance-related, financial-related, and/or other offers or services to existing customers at vehicle dealerships.

FIG. 11 illustrates another exemplary computer-implemented method for providing insurance quotes; loan offers; and/or insurance-related, financial-related, and/or other offers or services to existing customers at vehicle dealerships 1100. The method 1100 may include detecting that a mobile device is in the vicinity of a new vehicle 1102; transmitting a request for a data transmission (including vehicle and/or insurance data) from the mobile device to a vehicle controller or beacon 1104; detecting the broadcast at the mobile device 1106; receiving the broadcast at the mobile device and determining a vehicle make/model/year/features 1108; requesting and receiving insurance and/or loan data from a remote server 1110, 1112; presenting the vehicle and/or insurance information on a display of the mobile device 1114; and/or transmitting acceptance and/or modification of an insurance quote and/or loan offer from the mobile device to the vehicle controller, vehicle-mounted beacon, and/or insurance provider or financial services provider remote server 1116.

As a result, insurance quotes and loan offers may be provided to an existing customer or policyholder via wireless communication or data transmission. Additionally or alternatively, other insurance or financial services or products may be provided to the existing customer or provider, and/or insurance-related or financial-related transactions may be completed, enhancing the online customer experience. The method may include additional, less, or alternate actions, including those discussed elsewhere herein.

Another Exemplary Computer-Implemented Method

Figure 12:
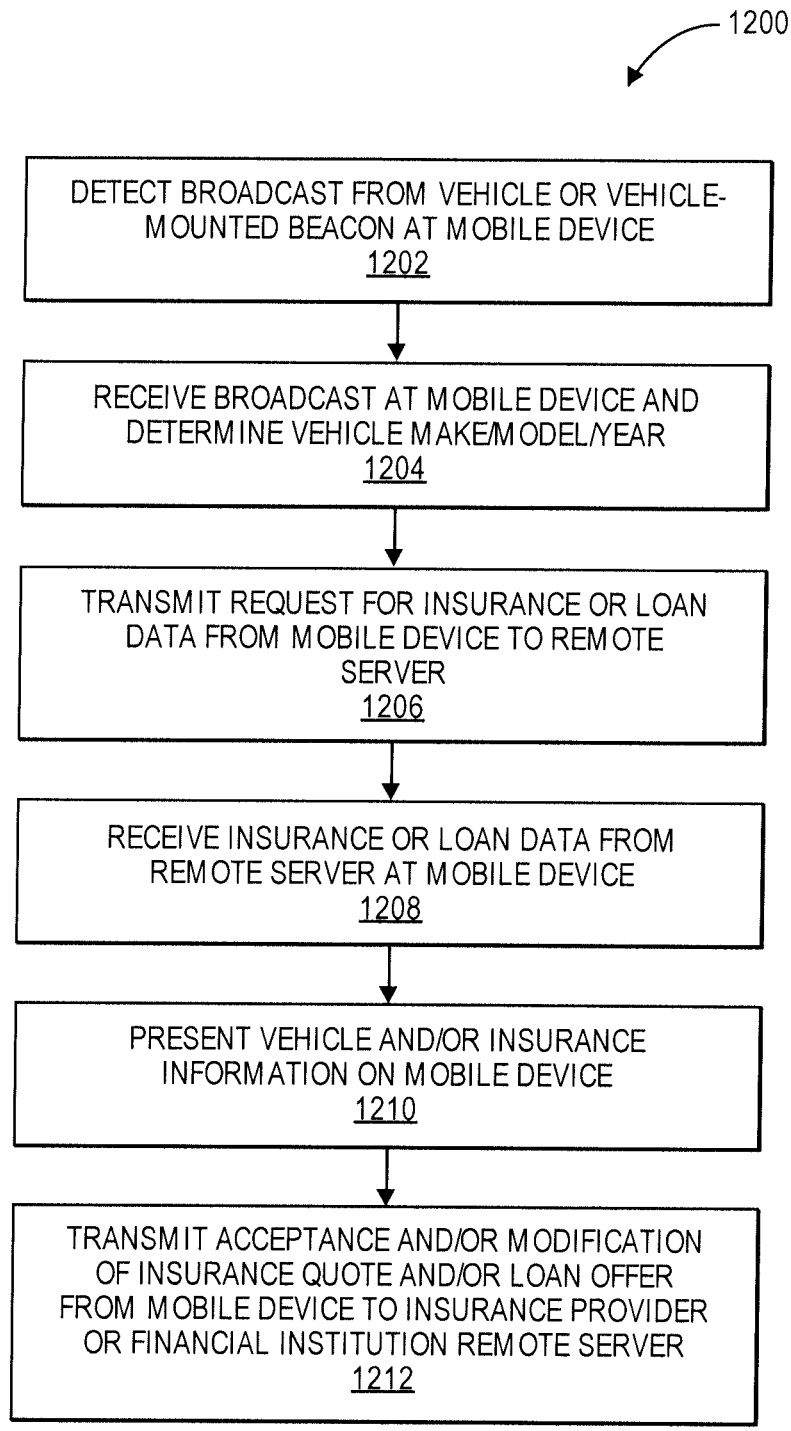
FIG. 12 illustrates another exemplary computer-implemented method for providing insurance quotes; loan offers; and/or insurance-related, financial-related, and/or other offers or services to existing customers at vehicle dealerships.

FIG. 12 illustrates another exemplary computer-implemented method for providing insurance quotes; loan offers; and/or insurance-related, financial-related, and/or other offers or services to existing customers at vehicle dealerships 1200. The method 1200 may include detecting a broadcast from a vehicle controller or vehicle-mounted beacon at a mobile device 1202; receiving the broadcast at the mobile device and determining a vehicle make/model/year/features 1204; transmitting a request for insurance or loan data from the mobile device to a remote server 1206; receiving insurance and/or loan data from the remote server at the mobile device 1208; presenting the vehicle and/or insurance or loan information on a display of the mobile device 1210; and/or transmitting acceptance and/or modification of an insurance quote and/or loan offer from the mobile device to the remote sever 1212, such as insurance provider or financial services provider remote server.

The method 1200 may include detecting a broadcast from a vehicle controller or vehicle-mounted beacon at a mobile device 1202. The mobile device 1202 may be configured to determine if it is capable of receiving, or within range of, a Bluetooth®, Near Field Communication, other wireless data transmission or communication techniques, or other type broadcast.

After which, the mobile device may receive and store the broadcast 1204, such storing the broadcast into a memory unit. For the broadcasted information or data, the mobile device may determine a vehicle make, model, year, miles, and/or other features of the vehicle. For instance, such vehicle information may be contained within the broadcast.

The method 1200 may include transmitting a request for insurance or loan data from the mobile device to a remote server 1206. For instance, the mobile device may transmit the vehicle information along with a request for vehicle insurance or vehicle financing for the vehicle.

Then the method 1200 may include receiving insurance and/or loan data from the remote server at the mobile device 1208. The remote server may be an insurance provider remote server. The remote server may analyze the vehicle information and insurance customer information, and generate and transmit a quote for vehicle insurance to the mobile device. Additionally or alternatively, the remote server may be a financial services or bank remote server. The remote server may analyze the vehicle information and customer financial or credit information, and generate and transmit an offer for a vehicle loan to the mobile device.

The method 1200 may include presenting the vehicle and/or insurance or loan information on a display of the mobile device 1210. The customer may view the information presented. The customer may accept an offer for vehicle insurance or an offer for a vehicle loan. Additionally or alternatively, the customer may modify the offers using their mobile device, such as modifying a deductible or limit of an auto insurance policy, or modifying the length or down payment associated with a vehicle loan.

The method 1200 may include transmitting the acceptance and/or modification of an insurance quote and/or loan offer from the mobile device to the remote sever 1212. After which, the remote server, such as insurance provider or financial services provider remote server, may finalize the transaction and/or notify the customer and/or vehicle dealership that the customer has vehicle financing and/or insurance coverage for the new vehicle.

As a result, insurance quotes and loan offers may be provided to an existing customer or policyholder via wireless communication or data transmission. Additionally or alternatively, other insurance or financial services or products may be provided to the existing customer or provider, and/or insurance-related or financial-related transactions may be completed, enhancing the online customer experience. The method may include additional, less, or alternate actions, including those discussed elsewhere herein.

Exemplary Mobile Device-Based Method

In one aspect, a computer-implemented method of providing insurance quotes, loan offers, and/or other services or products to existing insurance policyholders at vehicle dealerships may be provided. The method may include (1) detecting, via one or more processors (such as a mobile device processor), a Bluetooth® or other broadcast from a vehicle-mounted beacon or a vehicle controller, the broadcast including vehicle information associated with a new vehicle. The method may include (2) receiving, via the one or more (mobile device) processors, the broadcast from the vehicle-mounted beacon and/or a vehicle controller; (3) transmitting, via the one or more (mobile device) processors, the vehicle information, to a remote server (such as an insurance or financial services provider remote server); (4) receiving, via the one or more processors, one or more offers for products or services associated with purchasing the new vehicle, such as (i) an insurance quote for insurance covering the new vehicle, and/or (ii) a vehicle loan offer for financing the new vehicle; (5) presenting, via the one or more processors, the one or more offers for products or services associated with purchasing the new vehicle (including the insurance quote for insurance covering the new vehicle, and/or the vehicle loan offer for financing the new vehicle) on a display of the mobile device for review, acceptance, and/or modification by a pre-existing customer or insurance policyholder; and/or (6) transmitting, via the one or more processors, an acceptance or modification of the one or more offers for products or services (including the insurance quote or vehicle loan offer) from the mobile device (such as sending a data transmission to an insurance or financial services provider remote server) via wireless communication to facilitate providing insurance for the new vehicle or a new loan for purchasing the new vehicle to the pre-existing customer or insurance policyholder, or completing another transaction for products or services. The method may include additional, less, or alternate actions, including those discussed elsewhere herein.

For instance, the broadcast may be initiated by the vehicle-mounted beacon or vehicle controller when is it determined or otherwise detected that the mobile device is within a broadcast range of the vehicle-mounted beacon or vehicle controller, such as within a Bluetooth® or NFC broadcast range. Additionally or alternatively, the broadcast may be initiated by the vehicle-mounted beacon or vehicle controller by a trigger event. The trigger event may be a door of the new vehicle being opened or shut (as determined by a door mounted sensor); someone sitting in the driver's seat of the vehicle (as determined by seat pressure sensor); the engine of the new vehicle starting (as determine by engine rpm); and/or the new vehicle moving (as determined by an accelerometer).

Additional Exemplary Mobile Device-Based Methods

In one aspect, a computer-implemented method of providing insurance quotes, loan offers, and/or other services or products to existing insurance policyholders at vehicle dealerships may be provided. The method may include (1) determining or detecting, via one or more processors (such as one or more processors of a mobile device), that the mobile device is (i) within Bluetooth® (or NFC, or other wireless communication or data transmission technique) range of a vehicle-mounted beacon or a vehicle controller; and/or (ii) within or in the vicinity of a new vehicle; (2) in response or otherwise, receiving, via the one or more processors, a broadcast from the vehicle-mounted beacon or vehicle controller, the broadcast containing (a) vehicle information associated with the new vehicle, (b) an insurance quote for insurance covering the new vehicle, and/or (c) a vehicle loan offer for financing the new vehicle; (3) presenting, via the one or more processors, (a) vehicle information associated with the new vehicle, (b) the insurance quote for insurance covering the new vehicle, and/or (c) the vehicle loan offer for financing the new vehicle on a display of the mobile device for review, acceptance, and/or modification by a pre-existing customer or insurance policyholder; and/or (4) transmitting, via the one or more processors, an acceptance or modification of the insurance quote or vehicle loan offer from the mobile device (such as to an insurance provider or financial services provider remote server) via wireless communication or data transmission to facilitate providing products or services associated with purchasing a vehicle to the pre-existing customer or insurance policyholder. The method may include additional, less, or alternate actions, including those discussed elsewhere herein.

For instance, the information may be transmitted to the mobile device of the customer only after the customer sends an indication that they are in the market for a new or different vehicle. Detecting, via the one or more processors, that the mobile device associated is within or near a new vehicle may be determined by a trigger event, the trigger event including (1) opening a vehicle door; (2) starting a vehicle; (3) moving the vehicle; (4) a signal from a vehicle-mounted, vehicle-mounted beacon or other communication beacon, or mobile device accelerometer, speed sensor, motion sensor, or other type of sensor, including those discussed elsewhere herein; and/or (5) a signal from a vehicle seat pressure sensor.

In another aspect, a computer-implemented method of providing insurance quotes, loan offers, and/or other services or products to existing insurance policyholders at vehicle dealerships. The method may include (1) receiving, via the one or more processors (such as one or more processors of a mobile device), a broadcast from a vehicle-mounted beacon, a vehicle controller, and/or a remote server (such as an insurance provider remote server or a financial services provider remote server), the broadcast containing (a) vehicle information associated with the new vehicle, (b) an insurance quote for insurance covering the new vehicle, and/or (c) a vehicle loan offer for financing the new vehicle; (2) presenting, via the one or more processors, (a) vehicle information associated with the new vehicle, (b) the insurance quote for insurance covering the new vehicle, and/or (c) the vehicle loan offer for financing the new vehicle on a display of the mobile device for review, acceptance, and/or modification by a pre-existing customer or insurance policyholder; and/or (3) transmitting, via the one or more processors, an acceptance or modification of the insurance quote or vehicle loan offer from the mobile device (such as sending a data transmission to an insurance or financial services provider remote server) via wireless communication to facilitate providing insurance for the new vehicle or a new loan for purchasing the new vehicle to the pre-existing customer or insurance policyholder. The method may include additional, less, or alternate actions, including those discussed elsewhere herein.

For instance, the method may include determining or detecting, via one or more processors (such as one or more processors of a mobile device), that the mobile device is (i) within Bluetooth® (or NFC, or other wireless communication or data transmission technique) range of a vehicle-mounted beacon or a vehicle controller; and/or (ii) within or in the vicinity of a new vehicle may be achieved before the broadcast is transmitted (such as transmitted by a vehicle-mounted beacon and/or vehicle controller).

In another aspect, a computer-implemented method of providing insurance quotes, loan offers, and/or other services or products to existing insurance policyholders at vehicle dealerships may be provided. The method may include (1) receiving, via the one or more processors (such as one or more processors of a mobile device), a broadcast from a vehicle-mounted beacon and/or a vehicle controller, the broadcast containing vehicle information associated with a new vehicle; (2) transmitting, via the one or more processors, the vehicle information, to a remote server (such as an insurance or financial services provider remote server); (3) receiving, via the one or more processors, one or more offers for products or services associated with purchasing the new vehicle, such as (i) an insurance quote for insurance covering the new vehicle, and/or (ii) a vehicle loan offer for financing the new vehicle; (4) presenting, via the one or more processors, the one or more offers for products or services associated with purchasing the new vehicle (including the insurance quote for insurance covering the new vehicle, and/or the vehicle loan offer for financing the new vehicle) on a display of the mobile device for review, acceptance, and/or modification by a pre-existing customer or insurance policyholder; and/or (5) transmitting, via the one or more processors, an acceptance or modification of the one or more offers for products or services (including the insurance quote or vehicle loan offer) from the mobile device (such as sending a data transmission to an insurance or financial services provider remote server) via wireless communication to facilitate providing insurance for the new vehicle or a new loan for purchasing the new vehicle to the pre-existing customer or insurance policyholder. The method may include additional, less, or alternate actions, including those discussed elsewhere herein.

For instance, the method may further include receiving, via the one or more processors (of the mobile device), a confirmation that a vehicle insurance application and/or vehicle loan application has been accepted and that the customer has acquired the desired product (e.g., insurance for the new vehicle, financing for the new vehicle, etc.); and/or presenting, via the one or more processors, the confirmation on a display to the customer.

Additional Exemplary Methods

In one aspect, a computer-implemented method of providing insurance quotes, loan offers, and/or other services or products to existing insurance policyholders at vehicle dealerships may be provided. The method may include (1) detecting, via one or more processors, that a mobile device associated is within or near a new vehicle; and/or (2) in response, broadcasting, via the one or more processors, vehicle information, an insurance quote, and/or loan offer to the mobile device to facilitate the mobile device displaying the vehicle information, the insurance quote, and/or the loan offer on a display of the mobile device for an insurance policyholder's review, acceptance, and/or modification. The method may include additional, less, or alternate actions, including those discussed elsewhere herein.

For instance, the one or more processors may be associated with a vehicle controller, a vehicle-mounted beacon, an insurance provider remote server, and/or a financial services provider remote server. Detecting, via the one or more processors, that the mobile device associated is within or near a new vehicle may be determined by a trigger event, the trigger event including (1) opening a vehicle door; (2) starting a vehicle; (3) moving the vehicle; (4) a signal from a vehicle-mounted, vehicle-mounted beacon or other communication beacon, or mobile device accelerometer, speed sensor, motion sensor, or other type of sensor, including those discussed elsewhere herein; and/or (5) a signal from a vehicle seat pressure sensor. Additionally or alternatively, detecting, via the one or more processors, that the mobile device associated is within or near a new vehicle may be determined by a trigger event, the trigger event including determining that the mobile device is within Bluetooth® broadcast range of a vehicle controller (or transceiver) and/or a vehicle-mounted beacon. The insurance quote may be for automobile insurance covering a new automobile, and/or the loan offer may be for a vehicle loan for purchasing the new automobile.

In another aspect, a computer-implemented method of providing insurance quotes, loan offers, and/or other services or products to existing insurance policyholders at vehicle dealerships may be provided. The method may include (1) determining, via one or more processors (such as one or more processors associated with a vehicle controller or vehicle-mounted beacon), that a mobile device is (i) within Bluetooth® (or NFC, or other wireless communication or data transmission technique) range of a vehicle-mounted beacon or a vehicle controller; and/or (ii) within or in the vicinity of a new vehicle; and/or (2) in response, broadcasting, via the one or more processors, vehicle information associated with the new vehicle, an insurance quote for insurance covering the new vehicle, and/or a vehicle loan offer for financing the new vehicle to facilitate the mobile device presenting the vehicle information, insurance quote, and/or vehicle loan offer on a display of the mobile device for review, acceptance, and/or modification by a pre-existing customer or insurance policyholder. The method may include additional, less, or alternate actions, including those discussed elsewhere herein.

For instance, the one or more processors may be associated with a vehicle controller, a vehicle-mounted beacon, an insurance provider remote server, and/or a financial services provider remote server. The insurance quote may be for automobile insurance covering a new automobile, and/or the loan offer may be for a vehicle loan for purchasing the new automobile.

Detecting, via the one or more processors, that the mobile device associated is within or near a new vehicle may be determined by a trigger event, the trigger event including (1) opening or closing a vehicle door; (2) starting a vehicle or engine RPM (rotations per minute) sensor; (3) moving the vehicle; (4) a signal from a vehicle-mounted, vehicle-mounted or other communication beacon, or mobile device accelerometer, speed sensor, motion sensor, or other type of sensor, including those discussed elsewhere herein; (5) sound or body heat being detected in the vicinity of the vehicle; (6) operating or adjusting a window, mirror, steering wheel, seat, or entertainment system (e.g., turn on or tune radio); and/or (7) a signal from a vehicle seat pressure sensor. Additionally or alternatively, detecting, via the one or more processors, that the mobile device associated is within or near a new vehicle may be determined by a trigger event, the trigger event including determining that the mobile device is within Bluetooth® broadcast range (or NFC, or other wireless communication or data transmission technique range) of a vehicle controller (or transceiver) and/or a vehicle-mounted beacon.

Exemplary Near Field Communication

Near field communication (NFC) is a known technology. NFC may enable mobile devices, such as smartphones or tablets, and other devices (such as communication beacons and/or vehicle control/communication systems) to establish radio frequency communication with each other by touching the devices together or bringing them in close proximity to each other, such as within a distance of 3-4 inches.

Each NFC device may work in a number of known modes, such as NFC Card Emulation; NFC Reader/Writer; and/or NFC Peer-to-Peer (P2P mode). NFC Card emulation mode may enable NFC-enabled devices to act like smart cards. NFC Reader/writer mode may enable NFC-enabled devices to read information stored on inexpensive NFC tags embedded in labels or smart posters. And NFC Peer-to-Peer mode may enable two NFC-enabled devices to communicate with each other to exchange information in a various manners. In other embodiments, NFC tags, and/or RFID (radio frequency identification) techniques may be utilized.

As noted herein, the present embodiments may enhance new or used vehicle shopping. As a customer interested in purchasing a vehicle walks about a vehicle display room or vehicle dealership lot, they may move or position their mobile device within NFC communication range (e.g., a few inches) of a vehicle, communication beacon, and/or vehicle control system (or even touch or tap the vehicle, communication beacon, and/or vehicle control system (or vehicle controller)) to initiate wireless communication between the mobile device of the customer and the vehicle, communication beacon, and/or vehicle control system.

For instance, NFC communication may be used to transmit vehicle information (such as features and pricing), vehicle loan information or offers, auto insurance offers or quotes, and/or other information, including that discussed herein, when a customer shopping for a vehicle brings their mobile device within NFC communication range of the vehicle, vehicle control system or vehicle controller, or a communication beacon, such as vehicle-mounted communication beacon. Vehicle information may also include all local vehicle prices, deals, or loan offers from a local vehicle dealership and/or other dealerships in the area. Vehicle information may also include average vehicle pricing and/or loan information or insurance quotes/rates for specific types of vehicles.

In addition to NFC communication, Bluetooth® communication techniques or other low power or low broadcast range techniques may be used to transmit information from the vehicle, vehicle control system or vehicle controller, and/or communication beacon to and/or from the customer's mobile device. Bringing the mobile device within NFC communication range of a communication beacon, vehicle, and/or vehicle control system may be another trigger event, as used herein.

In one aspect, a computer-implemented method of providing vehicle, vehicle loan, and/or auto insurance information to a customer via their mobile device may be provided. The method may include (1) receiving, at a vehicle-mounted communication beacon or a vehicle control system (of a vehicle) via wireless communication and/or data transmission, an indication that a mobile device (of a potential vehicle purchaser) is within NFC or Bluetooth® wireless communication range; and/or (2) transmitting, from the vehicle-mounted communication beacon or vehicle control system, vehicle specific information (regarding the vehicle, such as pricing and feature information), vehicle loan information, and/or auto insurance (covering the vehicle) pricing or quote information at, or on, a NFC or Bluetooth® radio frequency or band to the mobile device to facilitate providing the potential vehicle purchaser with such information, such as by displaying the information received via wireless communication or data transmission on a display of the potential vehicle purchaser's mobile device for their review and/or approval. The method may include additional, less, or alternate actions, including those discussed elsewhere herein.

In another aspect, a computer-implemented method of providing vehicle, vehicle loan, and/or auto insurance information to a customer via their mobile device may be provided. The method may include (1) bringing or positioning a mobile device within NFC or Bluetooth® communication range of a vehicle; (2) receiving, via the mobile device (and/or associated processors and mobile device transceiver), vehicle information associated with the vehicle via a NFC or Bluetooth® data transmission or wireless communication, from a vehicle-mounted communication beacon and/or vehicle computer system (such as a vehicle controller or vehicle controller system) configured with a transceiver; and/or (3) displaying, via the mobile device (such as on a mobile device display screen), the vehicle information received from the vehicle-mounted communication beacon and/or vehicle computer system via wireless communication or data transmission for the customer's review to facilitate enhancing the vehicle purchasing experience and/or providing vehicle loans or insurance to the customer. The vehicle information associated with the vehicle may include vehicle feature and/or pricing information; vehicle dealership offers on pricing, loans, or financing; vehicle loan information and/or quotes; and/or auto insurance information and/or quotes for the vehicle. The method may include additional, less, or alternative actions, including those discussed herein.

Exemplary Computer Systems

In one aspect, a computer system for providing insurance quotes, loan offers, and/or other services or products to existing insurance policyholders at vehicle dealerships may be provided. The computer system may include one or more local or remote processors and/or associated transceivers configured to: (1) determine or detect that a mobile device is (i) within Bluetooth® range, Near Field Communication (NFC) broadcast range, or other wireless data transmission or communication technique communication range of the vehicle-mounted beacon or a vehicle controller; or (ii) within, or in the vicinity of, a new vehicle; and in response, broadcast vehicle information associated with the new vehicle, an insurance quote for insurance covering the new vehicle, or a vehicle loan offer for financing the new vehicle via wireless communication and data transmission to facilitate the mobile device presenting the vehicle information, insurance quote, or vehicle loan offer, respectively, on a display of the mobile device for review, acceptance, and/or modification by a pre-existing customer or insurance policyholder.

The one or more processors and associated transceivers are associated with a vehicle controller, a vehicle-mounted beacon, an insurance provider remote server, or a financial services provider remote server. Detecting, via the one or more processors and/or associated transceivers, that the mobile device associated is within, or near, a new vehicle may be determined by a trigger event, the trigger event including (1) opening a vehicle door; or (2) starting a vehicle. Additionally or alternatively, detecting, via the one or more processors and/or associated transceivers, that the mobile device associated is within, or near, a new vehicle may be determined by a trigger event, the trigger event including: (1) moving the vehicle; (2) a signal from a vehicle-mounted accelerometer or other sensor; (3) a signal from a vehicle-mounted beacon accelerometer or other sensor; (4) a signal from a communication beacon-mounted accelerometer or other sensor; (5) a signal from a mobile device accelerometer or sensor; and/or (6) a signal from a vehicle seat pressure sensor.

Further, detecting, via the one or more processors and/or associated transceivers, that the mobile device associated is within or near a new vehicle is determined by a trigger event, the trigger event including determining that the mobile device is within Bluetooth® broadcast range, Near Field Communication (NFC) broadcast range, or other wireless data transmission or communication technique communication range of a vehicle controller (or transceiver) and/or a vehicle-mounted beacon. The insurance quote may be for automobile insurance covering a new automobile, and the loan offer may be for a vehicle loan for purchasing a new automobile.

In another aspect, a computer system for providing insurance quotes, loan offers, and/or other services or products to existing insurance policyholders at vehicle dealerships may be provided. The computer system may include one or more local or remote processors and/or associated transceivers configured to: (1) determine or detect that the mobile device is (i) within Bluetooth® range, Near Field Communication (NFC) broadcast range, or other wireless data transmission or communication technique communication range of a vehicle-mounted beacon or a vehicle controller; or (ii) within, or in the vicinity of, a new vehicle; (2) in response or otherwise, receive a broadcast from the vehicle-mounted beacon or vehicle controller via wireless communication and/or data transmission, the broadcast containing (a) vehicle information associated with the new vehicle, (b) an insurance quote for insurance covering the new vehicle, and/or (c) a vehicle loan offer for financing the new vehicle; (3) present (a) vehicle information associated with the new vehicle, (b) the insurance quote for insurance covering the new vehicle, or (c) the vehicle loan offer for financing the new vehicle on a display of the mobile device for review, acceptance, and/or modification by a pre-existing customer or insurance policyholder; and/or (4) transmit an acceptance or modification of the insurance quote or vehicle loan offer from the mobile device to an insurance provider or financial services provider remote server via wireless communication or data transmission to facilitate providing products or services associated with purchasing a vehicle to the pre-existing customer or insurance policyholder. The information may be transmitted to the mobile device of the customer only after the customer sends an indication that they are in the market for a new or different vehicle.

In another aspect, a computer system for providing insurance quotes, loan offers, and/or other services or products to existing insurance policyholders at vehicle dealerships may be provided. The computer system may include one or more local or remote processors and/or associated transceivers configured to: (1) receive a broadcast from a vehicle-mounted beacon, a vehicle controller, and/or a remote server (such as an insurance provider remote server or a financial services provider remote server) via wireless communication and/or data transmission, the broadcast containing (a) vehicle information associated with the new vehicle, (b) an insurance quote for insurance covering the new vehicle, and/or (c) a vehicle loan offer for financing the new vehicle; (2) present (a) vehicle information associated with the new vehicle, (b) the insurance quote for insurance covering the new vehicle, and/or (c) the vehicle loan offer for financing the new vehicle on a display of the mobile device for review, acceptance, and/or modification by a pre-existing customer or insurance policyholder; and/or (3) transmit an acceptance or modification of the insurance quote or vehicle loan offer from the mobile device (such as sending a data transmission to an insurance or financial services provider remote server) via wireless communication and/or data transmission to facilitate providing insurance for the new vehicle or a new loan for purchasing the new vehicle to the pre-existing customer or insurance policyholder. The one or more processors (such as one or more processors of a mobile device) are configured to determine or detect that the mobile device is (i) within Bluetooth® range of a vehicle-mounted beacon, a vehicle controller, a vehicle control system, or a vehicle; and/or (ii) within or in the vicinity of a new vehicle is achieved before the broadcast is transmitted (such as transmitted by a vehicle-mounted beacon and/or vehicle controller). The one or more processors (such as one or more processors of a mobile device) are configured to determine or detect that the mobile device is within Near Field Communication (NFC) broadcast range, or other wireless data transmission or communication technique communication range of a vehicle-mounted beacon, a vehicle, a vehicle controller, or vehicle control system.

In another aspect, a computer system for providing insurance quotes, loan offers, and/or other services or products to existing insurance policyholders at vehicle dealerships may be provided. The computer system may include one or more local or remote processors and/or associated transceivers configured to: (1) receive a broadcast from a vehicle-mounted beacon and/or a vehicle controller via wireless communication and/or data transmission, the broadcast containing vehicle information associated with a new vehicle; (2) transmit the vehicle information via wireless communication and/or data transmission, to a remote server (such as an insurance or financial services provider remote server); (3) receive one or more offers for products or services associated with purchasing the new vehicle via wireless communication and/or data transmission, such as (i) an insurance quote for insurance covering the new vehicle, and/or (ii) a vehicle loan offer for financing the new vehicle; (4) present the one or more offers for products or services associated with purchasing the new vehicle (including the insurance quote for insurance covering the new vehicle, and/or the vehicle loan offer for financing the new vehicle) on a display of the mobile device for review, acceptance, and/or modification by a pre-existing customer or insurance policyholder; and/or (5) transmit an acceptance or modification of the one or more offers for products or services (including the insurance quote or vehicle loan offer) from the mobile device (such as sending a data transmission to an insurance or financial services provider remote server) via wireless communication and/or data transmission to facilitate providing insurance for the new vehicle or a new loan for purchasing the new vehicle to the pre-existing customer or insurance policyholder. The one or more processors and/or associated transceivers may be further configured to: receive a confirmation that a vehicle insurance application and/or vehicle loan application has been accepted and that the customer has acquired the desired product (e.g., insurance for the new vehicle, financing for the new vehicle, etc.); and/or present the confirmation on a display to the customer.

In another aspect, a computer system for providing insurance quotes, loan offers, and/or other services or products to existing insurance policyholders at vehicle dealerships may be provided. The computer system may include one or more local or remote processors and/or transceivers configured to: (1) detect a Bluetooth®, a NFC (Near Field Communication), or other wireless communication or data transmission broadcast from a vehicle-mounted beacon or a vehicle controller, the broadcast including vehicle information associated with a new vehicle; (2) receive the broadcast from the vehicle-mounted beacon and/or a vehicle controller via wireless communication and/or data transmission; (3) transmit the vehicle information, to a remote server (such as an insurance or financial services provider remote server) via wireless communication and/or data transmission; (4) receive one or more offers for products or services associated with purchasing the new vehicle via wireless communication and/or data transmission, such as (i) an insurance quote for insurance covering the new vehicle, and/or (ii) a vehicle loan offer for financing the new vehicle; (5) present the one or more offers for products or services associated with purchasing the new vehicle (including the insurance quote for insurance covering the new vehicle, and/or the vehicle loan offer for financing the new vehicle) on a display of the mobile device for review, acceptance, and/or modification by a pre-existing customer or insurance policyholder; and/or (6) transmit an acceptance or modification of the one or more offers for products or services (including the insurance quote or vehicle loan offer) from the mobile device (such as sending a data transmission to an insurance or financial services provider remote server) via wireless communication and/or data transmission to facilitate providing insurance for the new vehicle or a new loan for purchasing the new vehicle to the pre-existing customer or insurance policyholder, or completing another transaction for products or services.

The broadcast may be initiated by the vehicle-mounted beacon or vehicle controller when is it determined or otherwise detected that the mobile device is within a broadcast range of the vehicle-mounted beacon or vehicle controller, such as within a Bluetooth® or NFC broadcast range. Additionally or alternatively, the broadcast may be initiated by the vehicle-mounted beacon or vehicle controller by a trigger event, the trigger event being a door of the new vehicle being opened or shut (as determined by a door mounted sensor), someone sitting in the driver's seat of the vehicle (as determined by seat pressure sensor), the engine of the new vehicle starting (as determine by engine rpm), and/or the new vehicle moving (as determined by an accelerometer or speed sensor mounted on the vehicle-mounted beacon, vehicle, or mobile device).

In another aspect, a computer system for providing vehicle, vehicle loan, and/or auto insurance information to a customer via their mobile device may be provided. The computer system may include one or more local or remote processors and/or associated transceivers configured to: (1) receive (such as at a vehicle-mounted communication beacon or a vehicle control system (of a vehicle) via wireless communication and/or data transmission), an indication that a mobile device (of a potential vehicle purchaser) is within NFC or Bluetooth® wireless communication range; and/or (2) transmit (such as from the vehicle-mounted communication beacon or vehicle control system), vehicle specific information (regarding the vehicle, such as pricing and feature information), vehicle loan information, and/or auto insurance (covering the vehicle) pricing or quote information at, or on, a NFC or Bluetooth® radio frequency or band to the mobile device to facilitate providing the potential vehicle purchaser with such information, such as by displaying the information received via wireless communication or data transmission on a display of the potential vehicle purchaser's mobile device for their review and/or approval.

In yet another aspect, a computer system for providing vehicle, vehicle loan, and/or auto insurance information to a customer via their mobile device may be provided. The computer system may include one or more local or remote processors and/or associated transceivers configured to: (1) detect a customer bringing or positioning a mobile device within NFC or Bluetooth® communication range of a vehicle; (2) receive (such as via the mobile device (and/or associated processors and mobile device transceiver)), vehicle information associated with the vehicle via a NFC or Bluetooth® data transmission or wireless communication, from a vehicle-mounted communication beacon and/or vehicle computer system (such as a vehicle controller or vehicle controller system) configured with a transceiver; and/or (3) display (such as via the mobile device (such as on a mobile device display screen)), the vehicle information received from the vehicle-mounted communication beacon and/or vehicle computer system via wireless communication or data transmission for the customer's review to facilitate enhancing the vehicle purchasing experience and/or providing vehicle loans or insurance to the customer. The vehicle information associated with the vehicle may include vehicle feature and/or pricing information; vehicle dealership offers on pricing, loans, or financing; vehicle loan information and/or quotes; and/or auto insurance information and/or quotes for the vehicle.

The foregoing computer systems may include additional, less, or alternate functionality, including that discussed elsewhere herein. The foregoing computer systems may include one or more processors, transceivers, memory units, displays, mobile devices, local or remote servers, communication beacons, and/or other electronic componentry, including that discussed elsewhere herein.

Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the invention has been described with reference to the embodiments illustrated in the attached drawing figures, it is noted that equivalents may be employed and substitutions made herein without departing from the scope of the invention as recited in the claims.

I claim:

1. A system for transmitting and receiving vehicle and insurance information, the system comprising:
    at least one communication beacon, the at least one communication beacon associated with one of a plurality of vehicles for sale, positioned in or on the associated vehicle and transmitting information about the associated vehicle including a make and model via wireless communication and/or data transmission;
    at least one vehicle control system, the at least one vehicle control system associated with one of the vehicles for sale and configured to transmit information via wireless communication and/or data transmission about the associated vehicle including the make and model after a trigger event occurs;
    a mobile electronic device owned by a customer and including a communication element, a memory element, and a processing element executing a software application configured to
        receive vehicle information about a vehicle not currently owned by the customer from the at least one communication beacon or the at least one vehicle control system via wireless communication and/or data transmission,
        transmit the vehicle information to a computer server via wireless communication and/or data transmission,
        receive term information regarding an auto insurance quote from the computer server via wireless communication and/or data transmission, and
        display the term information on a screen to a customer to facilitate providing auto insurance to the customer; and
    the computer server, wherein the computer server is configured to
        receive the vehicle information from the at least one communication beacon or the at least one vehicle control system via the mobile electronic device,
        determine the term information based upon the vehicle information with the auto insurance quote including information for replacing a currently owned vehicle on a policy of the customer, and
        transmit the term information to the mobile electronic device.

2. The system of claim 1, wherein the software application is further configured to accept input from the customer to approve or modify the term information.

3. The system of claim 1, wherein the software application is further configured to transmit the input from the customer to the computer server.

4. The system of claim 1, wherein the at least one vehicle control system includes a sensor positioned in a seat of the associated vehicle configured to determine when the customer is sitting on the seat.

5. The system of claim 1, wherein the at least one vehicle control system or communication beacon, or the mobile electronic device, includes (1) an accelerometer or other speed sensor configured to determine when the customer drives the associated vehicle at a certain speed, or (2) a GPS (Global Positioning System) unit and GPS speed data is used to generate the trigger event when GPS speed is above the certain speed.

6. A computer-implemented method for transmitting and receiving vehicle and insurance information, the computer-implemented method comprising:
    detecting a trigger event occurring in a vehicle for sale with a vehicle control system, a communication beacon positioned in or on the vehicle, or a mobile electronic device, the mobile electronic device owned by a customer;
    transmitting information about the vehicle which is not currently owned by the customer from the vehicle control system or communication beacon after the trigger event occurs via wireless communication and/or data transmission, the information about the vehicle including a make and model of the vehicle;
    receiving vehicle information with the mobile electronic device via wireless communication and/or data transmission based on the trigger event occurring in the vehicle for sale;
    transmitting vehicle information from the mobile electronic device to a computer server via wireless communication and/or data transmission;
    receiving an insurance quote including information for replacing a currently-owned vehicle on a policy of the customer information with the mobile electronic device or vehicle control system from the computer server via wireless communication and/or data transmission; and
    displaying insurance quote information on the mobile electronic device or vehicle control system to a customer.

7. The computer-implemented method of claim 6, further comprising accepting input from the customer to approve or modify the term information.

8. The computer-implemented method of claim 6, further comprising transmitting the input from the customer to the computer server.

9. The system of claim 6, wherein the triggering event is detecting vehicle movement or based upon vehicle speed.

10. The system of claim 6, wherein the triggering event is detecting that the mobile electronic devices is within Bluetooth or other broadcast range of the vehicle control system or communication beacon.

11. The system of claim 6, wherein the triggering event is detecting vehicle door, or window operation, or another operation of a vehicle component.

12. A computer-implemented method of providing insurance quotes, and/or other services or products to existing insurance policyholders at vehicle dealerships, the method comprising:
   detecting, via one or more processors positioned in or on a new vehicle for sale, that a mobile device associated with an existing insurance policyholder is within or near the new vehicle for sale; and
   in response to detecting that the mobile device is within or near the new vehicle, broadcasting, via the one or more processors, vehicle information including a make and model of the vehicle, an insurance quote including information for replacing a currently-owned vehicle on a policy of the customer via wireless communication and/or data transmission to the mobile device via a computer server to facilitate the mobile device displaying the vehicle information, and the insurance quote on a display of the mobile device for the insurance policyholder's review, acceptance, and/or modification.

13. The computer-implemented method of claim 12, wherein the one or more processors are associated with a vehicle controller and a vehicle-mounted beacon.

14. The computer-implemented method of claim 12, wherein detecting, via the one or more processors, that the mobile device is within or near a new vehicle is determined by a trigger event, the trigger event including opening a vehicle door.

15. The computer-implemented method of claim 12, wherein detecting, via the one or more processors, that the mobile device is within or near a new vehicle is determined by a trigger event, the trigger event including starting a vehicle.

16. The computer-implemented method of claim 12, wherein detecting, via the one or more processors, that the mobile device is within or near a new vehicle is determined by a trigger event, the trigger event including moving the vehicle, and/or signal from a vehicle seat pressure sensor.

17. The computer-implemented method of claim 12, wherein detecting, via the one or more processors, that the mobile device is within or near a new vehicle is determined by a trigger event, the trigger event including (1) a signal from a vehicle-mounted accelerometer or other sensor; (2) a signal from a vehicle-mounted beacon accelerometer or other sensor; (3) a signal from a communication beacon-mounted accelerometer or other sensor; or (4) a signal from a mobile device accelerometer or other sensor.

18. The computer-implemented method of claim 12, wherein detecting, via the one or more processors, that the mobile device associated is within or near a new vehicle is determined by a trigger event, the trigger event including determining that the mobile device is within Bluetooth® broadcast range, Near Field Communication (NFC) broadcast range, or other wireless data transmission or communication technique communication range of a vehicle controller (or transceiver) and/or a vehicle-mounted beacon.

19. The computer-implemented method of claim 12, wherein the insurance quote is for automobile insurance covering a new automobile.

20. The system of claim 1, wherein the software application is further configured to receive term information including auto insurance quote information for adding the vehicle to the policy of the customer.

21. The system of claim 20, wherein the software application is further configured to display a first term information including a quote for adding the vehicle and a second term information including a quote for replacing the currently-owned vehicle to allow the customer to compare the first and second term information.

22. The computer-implemented method of claim 6, wherein the method further comprises receiving the insurance quote including information for adding the vehicle to the policy of the customer.

23. The computer-implemented method of claim 22, wherein the method further comprises displaying a first quote for adding the vehicle and a second quote for replacing the currently-owned vehicle to allow the customer to compare the first and second term information.

24. The computer-implemented method of claim 12, wherein the method further comprises broadcasting the insurance quote including information for adding the vehicle to the policy of the customer.

25. The computer-implemented method of claim 24, wherein the method further comprises displaying on the display of the mobile device a first quote for adding the vehicle and a second quote for replacing the currently-owned vehicle to allow the customer to compare the first and second quotes.

26. The system of claim 1, wherein the processing element executing the software application is further configured to
   receive a universal resource locator, and
   communicate the universal resource locator to a web browser which displays a web page on the screen of the mobile electronic device, the web page pointed to by the universal resource locator and including information about insurance rates.

27. The system of claim 1, wherein the at least one communication beacon retains the vehicle information in a memory element.

28. The computer-implemented method of claim 6, wherein the method further comprises
   receiving a universal resource locator, and
   communicating the universal resource locator to a web browser which displays a web page on a screen of the mobile electronic device, the web page pointed to by the universal resource locator and including information about insurance rates.

* * * * *